United States Patent
Lant et al.

(10) Patent No.: US 9,822,621 B2
(45) Date of Patent: *Nov. 21, 2017

(54) METHOD OF USING SURFACE MODIFYING TREATMENT AGENTS TO TREAT SUBTERRANEAN FORMATIONS

(71) Applicant: Baker Hughes Incorporated, Houston, TX (US)

(72) Inventors: Kimberly Lant, Magnolia, TX (US); Naima Bestaoui-Spurr, The Woodlands, TX (US); Sumit Bhaduri, The Woodlands, TX (US); James B. Crews, Willis, TX (US); Hoang Le, Spring, TX (US); Terry D. Monroe, Tomball, TX (US); Qi Qu, Spring, TX (US)

(73) Assignee: Baker Hughes, a GE company, LLC, Houston, TX (US)

( * ) Notice: Subject to any disclaimer, the term of this patent is extended or adjusted under 35 U.S.C. 154(b) by 77 days.

This patent is subject to a terminal disclaimer.

(21) Appl. No.: 14/491,772

(22) Filed: Sep. 19, 2014

(65) Prior Publication Data

US 2015/0083416 A1 Mar. 26, 2015

Related U.S. Application Data

(60) Provisional application No. 61/880,836, filed on Sep. 20, 2013, provisional application No. 61/981,051, (Continued)

(51) Int. Cl.
*E21B 43/16* (2006.01)
*E21B 43/26* (2006.01)
(Continued)

(52) U.S. Cl.
CPC .............. *E21B 43/16* (2013.01); *C09K 8/584* (2013.01); *C09K 8/60* (2013.01); *E21B 43/26* (2013.01); *C09K 2208/28* (2013.01)

(58) Field of Classification Search
CPC ......... E21B 43/16; E21B 43/26; C09K 8/584; C09K 8/60; C09K 2208/28
(Continued)

(56) References Cited

U.S. PATENT DOCUMENTS 3,285,339 A 11/1966 Walther et al.
3,593,796 A 7/1971 Stainback et al.
(Continued)

FOREIGN PATENT DOCUMENTS

CN 103013467 A 4/2013
EP 2 433 999 A1 3/2012
(Continued)

OTHER PUBLICATIONS

Tak-Sing Wong, Taolei Sun, Lin Feng, Joanna Aizenberg; "Interfacial Materials With Special Wettability"; MRS Bulletin; May 2013; 6 pages; vol. 38; Materials Research Society; Warrendale, PA.
(Continued)

*Primary Examiner* — Silvana Runyan
(74) *Attorney, Agent, or Firm* — John Wilson Jones; Jones Delflache LLP

(57) ABSTRACT

A well treatment fluid contains a surface modifying treatment agent having an anchor and a hydrophobic tail. The surface modifying treatment agent is an organophosphorus acid derivative. After the well treatment fluid is pumped into a well penetrating the subterranean formation, the anchor binds to the surface of the formation. The subterranean formation is a siliceous formation or a metal oxide-containing subterranean formation. The anchor bonds to a Si atom when the formation is a siliceous formation and to the metal
(Continued)

of the metal oxide when the formation is a metal oxide-containing formation. After being bound to the surface of the formation, frictional drag within the well is reduced. This allows for faster recovery of formation fluids. The bonding of the surface modifying treatment agent onto the formation may further be enhanced by first pre-treating the formation with a non-aqueous fluid. By increasing the number of sites for the surface modifying treatment agent to bind onto the surface of the subterranean formation, productivity is improved.

23 Claims, 3 Drawing Sheets

Related U.S. Application Data filed on Apr. 17, 2014, provisional application No. 61/989,267, filed on May 6, 2014, provisional application No. 62/007,708, filed on Jun. 4, 2014.

(51) Int. Cl.
  *C09K 8/60* (2006.01)
  *C09K 8/584* (2006.01)

(58) Field of Classification Search
  USPC ............ 166/305.1, 308.1, 250.01, 250.1
  See application file for complete search history.

(56) References Cited

U.S. PATENT DOCUMENTS

| | | |
|---|---|---|
| 4,042,032 A | 8/1977 | Anderson et al. |
| 4,074,536 A | 2/1978 | Young |
| 4,231,428 A | 11/1980 | Needham et al. |
| 4,366,071 A | 12/1982 | McLaughlin et al. |
| 4,366,072 A | 12/1982 | McLaughlin et al. |
| 4,366,073 A | 12/1982 | McLaughlin et al. |
| 4,366,074 A | 12/1982 | McLaughlin et al. |
| 4,374,739 A | 2/1983 | McLaughlin et al. |
| 4,460,483 A | 7/1984 | Weaver |
| 4,462,718 A | 7/1984 | McLaughlin et al. |
| 4,498,538 A | 2/1985 | Watkins et al. |
| 4,536,304 A | 8/1985 | Borchardt |
| 4,536,305 A | 8/1985 | Borchardt et al. |
| 4,580,633 A | 4/1986 | Watkins et al. |
| 4,585,064 A | 4/1986 | Graham et al. |
| 4,646,835 A | 3/1987 | Watkins et al. |
| 4,787,453 A | 11/1988 | Hewgill et al. |
| 5,291,949 A | 3/1994 | Dovan et al. |
| 5,406,085 A | 4/1995 | Sharma |
| 5,501,274 A | 3/1996 | Nguyen et al. |
| 5,582,249 A | 12/1996 | Caveny et al. |
| 5,730,922 A | 3/1998 | Babb et al. |
| 5,735,349 A * | 4/1998 | Dawson .............. C09K 8/512 166/294 |
| 5,775,425 A | 7/1998 | Weaver et al. |
| 5,787,986 A | 8/1998 | Weaver et al. |
| 5,839,510 A | 11/1998 | Weaver et al. |
| 5,853,048 A | 12/1998 | Weaver et al. |
| 5,853,049 A | 12/1998 | Keller |
| 5,871,049 A | 2/1999 | Weaver et al. |
| 5,883,300 A | 3/1999 | Johnson |
| 5,921,317 A | 7/1999 | Dewprashad et al. |
| 5,958,578 A | 9/1999 | Blohowiak et al. |
| 6,047,772 A | 4/2000 | Weaver et al. |
| 6,059,034 A | 5/2000 | Rickards et al. |
| 6,066,403 A | 5/2000 | Sherwood et al. |
| 6,146,767 A | 11/2000 | Schwartz |
| 6,209,643 B1 | 4/2001 | Nguyen et al. |
| 6,330,916 B1 | 12/2001 | Rickards et al. |
| 6,364,018 B1 | 4/2002 | Brannon et al. |
| 6,399,546 B1 | 6/2002 | Chang et al. |
| 6,521,334 B1 | 2/2003 | Ogawa et al. |
| 6,586,483 B2 | 7/2003 | Kolb et al. |
| 6,593,000 B2 | 7/2003 | Ohtake et al. |
| 6,683,309 B2 | 1/2004 | Sharma |
| 6,689,854 B2 | 2/2004 | Fan et al. |
| 6,749,025 B1 | 6/2004 | Brannon et al. |
| 6,772,838 B2 | 8/2004 | Dawson et al. |
| 7,040,403 B2 | 5/2006 | Nguyen et al. |
| 7,063,150 B2 | 6/2006 | Slabaugh et al. |
| 7,063,151 B2 | 6/2006 | Nguyen et al. |
| 7,163,060 B2 | 1/2007 | Weiss et al. |
| 7,166,851 B2 | 1/2007 | Sharma |
| 7,198,681 B2 | 4/2007 | Nguyen et al. |
| 7,204,311 B2 | 4/2007 | Welton et al. |
| 7,252,146 B2 | 8/2007 | Slabaugh et al. |
| 7,258,170 B2 | 8/2007 | Nguyen et al. |
| 7,261,156 B2 | 8/2007 | Nguyen et al. |
| 7,264,051 B2 | 9/2007 | Nguyen et al. |
| 7,281,150 B1 | 10/2007 | Strickland |
| 7,281,580 B2 | 10/2007 | Parker et al. |
| 7,281,581 B2 | 10/2007 | Nguyen et al. |
| 7,299,869 B2 | 11/2007 | Kalman |
| 7,314,850 B2 | 1/2008 | Taylor et al. |
| 7,325,608 B2 | 2/2008 | van Batenburg et al. |
| 7,328,744 B2 | 2/2008 | Taylor et al. |
| 7,343,972 B2 | 3/2008 | Willingham et al. |
| 7,350,571 B2 | 4/2008 | Nguyen et al. |
| 7,361,724 B2 | 4/2008 | Guire et al. |
| 7,397,072 B2 | 7/2008 | Dodabalapur et al. |
| 7,424,911 B2 | 9/2008 | McCarthy et al. |
| 7,426,961 B2 | 9/2008 | Stephenson et al. |
| 7,452,417 B2 | 11/2008 | Matula et al. |
| 7,459,209 B2 | 12/2008 | Smith et al. |
| 7,461,697 B2 | 12/2008 | Todd et al. |
| 7,500,519 B2 | 3/2009 | Weaver et al. |
| 7,534,745 B2 | 5/2009 | Taylor et al. |
| 7,538,538 B2 | 5/2009 | Dodabalapur et al. |
| 7,549,470 B2 | 6/2009 | Vinegar et al. |
| 7,550,413 B2 | 6/2009 | Huang et al. |
| 7,566,686 B2 | 7/2009 | Kippie et al. |
| 7,571,767 B2 | 8/2009 | Parker et al. |
| 7,591,313 B2 | 9/2009 | Weaver et al. |
| 7,608,571 B2 | 10/2009 | Futterer et al. |
| 7,624,802 B2 | 12/2009 | McCrary et al. |
| 7,625,674 B2 | 12/2009 | Sharma et al. |
| 7,631,697 B2 | 12/2009 | Bhavsar |
| 7,691,478 B2 | 4/2010 | Avaltroni |
| 7,691,789 B2 | 4/2010 | Fu et al. |
| 7,723,272 B2 | 5/2010 | Crews et al. |
| 7,730,948 B2 | 6/2010 | de Grood et al. |
| 7,740,940 B2 | 6/2010 | Hanson |
| 7,772,162 B2 | 8/2010 | Pope et al. |
| 7,781,381 B2 | 8/2010 | Ke et al. |
| 7,825,269 B2 | 11/2010 | Mangelsdorf et al. |
| 7,845,409 B2 | 12/2010 | Shinbach et al. |
| 7,855,169 B2 | 12/2010 | Pope et al. |
| 7,858,561 B2 | 12/2010 | Abad et al. |
| 7,879,437 B2 | 2/2011 | Hanson |
| 7,886,822 B2 | 2/2011 | Garcia-Lopez De Victoria et al. |
| 7,901,777 B2 | 3/2011 | Hanson |
| 7,921,911 B2 | 4/2011 | Fuller et al. |
| 7,931,087 B2 | 4/2011 | Gupta |
| 7,989,069 B2 | 8/2011 | Bruner |
| 8,006,760 B2 | 8/2011 | Fleming et al. |
| 8,025,974 B2 | 9/2011 | Hanson |
| 8,034,395 B2 | 10/2011 | Hofer et al. |
| 8,043,998 B2 | 10/2011 | Pope et al. |
| 8,047,288 B2 | 11/2011 | Skala et al. |
| 8,048,487 B2 | 11/2011 | Hanson |
| 8,056,630 B2 | 11/2011 | Huang et al. |
| 8,067,103 B2 | 11/2011 | Hanson |
| 8,084,401 B2 | 12/2011 | Lukocs et al. |
| 8,092,585 B2 | 1/2012 | Schwartz et al. |
| 8,138,127 B2 | 3/2012 | Pope et al. |
| 8,178,004 B2 | 5/2012 | Hanson |
| 8,178,476 B2 | 5/2012 | Xie et al. |
| 8,201,630 B2 | 6/2012 | Welton |
| 8,227,026 B2 | 7/2012 | McDaniel et al. |
| 8,236,426 B2 | 8/2012 | Hanson |
| 8,261,825 B2 | 9/2012 | Pope et al. |

(56) References Cited

U.S. PATENT DOCUMENTS

| | | |
|---|---|---|
| 8,267,170 B2 | 9/2012 | Fowler et al. |
| 8,276,663 B2 | 10/2012 | Holtsclaw et al. |
| 8,276,664 B2 | 10/2012 | Gupta |
| 8,293,687 B2 | 10/2012 | Giffin |
| 8,337,985 B2 | 12/2012 | Hanson |
| 8,403,050 B2 | 3/2013 | Pope et al. |
| 8,418,759 B2 | 4/2013 | Moore et al. |
| 8,432,036 B2 | 4/2013 | Hanson et al. |
| 8,445,423 B2 | 5/2013 | Bruner et al. |
| 8,596,361 B2 | 12/2013 | Willberg et al. |
| 8,609,067 B2 | 12/2013 | Adams et al. |
| 8,629,089 B2 | 1/2014 | Dams |
| 8,678,090 B2 | 3/2014 | Baran, Jr. et al. |
| 8,701,763 B2 | 4/2014 | Baran, Jr. et al. |
| 8,741,658 B2 | 6/2014 | Boss et al. |
| 8,783,352 B2 | 7/2014 | Chenevert et al. |
| 8,813,842 B2 | 8/2014 | Crandall et al. |
| 8,833,449 B2 | 9/2014 | Dams et al. |
| 8,989,847 B2 | 3/2015 | Adams et al. |
| 9,057,012 B2 | 6/2015 | Dams et al. |
| 9,200,102 B2 | 12/2015 | Baran, Jr. et al. |
| 9,226,731 B2 | 1/2016 | Liu et al. |
| 2002/0065358 A1* | 5/2002 | Carter .................. C02F 5/12 524/555 |
| 2003/0083448 A1 | 5/2003 | Fan et al. |
| 2004/0177957 A1* | 9/2004 | Kalfayan ............ C09K 8/5083 166/270 |
| 2004/0186254 A1 | 9/2004 | Fan et al. |
| 2005/0244641 A1 | 11/2005 | Vincent |
| 2006/0065396 A1 | 3/2006 | Dawson et al. |
| 2006/0073393 A1 | 4/2006 | Sharma et al. |
| 2006/0272816 A1 | 12/2006 | Willberg et al. |
| 2007/0039632 A1 | 2/2007 | Dawson |
| 2007/0079965 A1 | 4/2007 | Nguyen et al. |
| 2007/0131422 A1 | 6/2007 | Gatlin et al. |
| 2007/0131425 A1 | 6/2007 | Gatlin et al. |
| 2007/0212700 A1 | 9/2007 | Ranganathan et al. |
| 2007/0219173 A1 | 9/2007 | Mangelsdorf et al. |
| 2008/0035340 A1 | 2/2008 | Welton et al. |
| 2008/0153720 A1 | 6/2008 | Huang et al. |
| 2008/0182761 A1 | 7/2008 | Stephenson et al. |
| 2008/0236842 A1 | 10/2008 | Bhavsar et al. |
| 2008/0257553 A1 | 10/2008 | Gatlin et al. |
| 2008/0278140 A1 | 11/2008 | Dodabalapur et al. |
| 2009/0011222 A1 | 1/2009 | Xiu et al. |
| 2009/0011248 A1 | 1/2009 | Hanson |
| 2009/0023618 A1* | 1/2009 | Futterer .................. C09K 8/58 507/237 |
| 2009/0062155 A1 | 3/2009 | Pope et al. |
| 2009/0114247 A1 | 5/2009 | Brown et al. |
| 2009/0203553 A1 | 8/2009 | Gatlin et al. |
| 2009/0275488 A1 | 11/2009 | Zamora et al. |
| 2009/0314549 A1 | 12/2009 | Chenevert et al. |
| 2009/0324834 A1 | 12/2009 | Hanson |
| 2010/0048429 A1 | 2/2010 | Dobson, Jr. et al. |
| 2010/0089578 A1 | 4/2010 | Nguyen et al. |
| 2010/0108379 A1 | 5/2010 | Edbury et al. |
| 2010/0130388 A1 | 5/2010 | Phatak et al. |
| 2010/0137169 A1 | 6/2010 | Pope et al. |
| 2010/0167964 A1 | 7/2010 | Pope et al. |
| 2010/0167965 A1 | 7/2010 | Sebastian et al. |
| 2010/0181068 A1 | 7/2010 | Pope et al. |
| 2010/0212905 A1 | 8/2010 | van Petegem et al. |
| 2010/0224361 A1 | 9/2010 | Pope et al. |
| 2010/0263865 A1 | 10/2010 | Willberg et al. |
| 2010/0263866 A1 | 10/2010 | Huang et al. |
| 2010/0292108 A1 | 11/2010 | Kakadjian et al. |
| 2010/0292110 A1 | 11/2010 | Pope et al. |
| 2010/0319920 A1 | 12/2010 | Pope et al. |
| 2011/0005756 A1 | 1/2011 | Kakadjian et al. |
| 2011/0028443 A1 | 2/2011 | Mangelsdorf et al. |
| 2011/0083849 A1 | 4/2011 | Medvedev et al. |
| 2011/0136704 A1 | 6/2011 | Sharma et al. |
| 2011/0160104 A1 | 6/2011 | Wu et al. |
| 2011/0201531 A1 | 8/2011 | Sharma et al. |
| 2011/0223125 A1 | 9/2011 | Hough et al. |
| 2011/0247823 A1 | 10/2011 | Dams et al. |
| 2011/0259592 A1 | 10/2011 | Reyes |
| 2011/0275947 A1 | 11/2011 | Feldman et al. |
| 2011/0319759 A1 | 12/2011 | Liu et al. |
| 2012/0003481 A1 | 1/2012 | Hanson |
| 2012/0004388 A1 | 1/2012 | Hanson |
| 2012/0088699 A1 | 4/2012 | Qin |
| 2012/0097194 A1 | 4/2012 | McDaniel et al. |
| 2012/0145390 A1 | 6/2012 | Parse et al. |
| 2012/0241156 A1 | 9/2012 | Mukhopadhyay et al. |
| 2012/0251556 A1 | 10/2012 | Allison et al. |
| 2012/0279704 A1 | 11/2012 | Eoff et al. |
| 2012/0285689 A1 | 11/2012 | Weaver et al. |
| 2012/0285690 A1 | 11/2012 | Weaver et al. |
| 2012/0318514 A1 | 12/2012 | Mesher |
| 2012/0318515 A1 | 12/2012 | Cawiezel et al. |
| 2012/0325485 A1 | 12/2012 | Qu et al. |
| 2012/0329171 A1 | 12/2012 | Ismagliov et al. |
| 2013/0037161 A1 | 2/2013 | Hanson et al. |
| 2013/0220608 A1 | 8/2013 | Rincon-Torres |
| 2013/0284518 A1 | 10/2013 | Wu et al. |
| 2013/0331305 A1 | 12/2013 | Aswath et al. |
| 2014/0014586 A1 | 1/2014 | Soane et al. |
| 2014/0096967 A1 | 4/2014 | Sharma et al. |
| 2014/0121514 A1 | 5/2014 | Adams et al. |
| 2014/0162173 A1 | 6/2014 | Smith, Jr. et al. |
| 2014/0224492 A1* | 8/2014 | Weaver .................. C09K 8/506 166/308.1 |
| 2015/0083397 A1 | 3/2015 | Monroe et al. |
| 2015/0083414 A1 | 3/2015 | Monroe et al. |
| 2015/0083415 A1 | 3/2015 | Monroe et al. |
| 2015/0083417 A1* | 3/2015 | Lant ........................ C09K 8/58 166/279 |
| 2015/0299561 A1 | 10/2015 | Monroe et al. |
| 2016/0069174 A1 | 3/2016 | Cannan et al. |

FOREIGN PATENT DOCUMENTS

| | | |
|---|---|---|
| WO | 2006023143 A1 | 3/2006 |
| WO | 2006056774 A2 | 6/2006 |
| WO | 2006123143 A1 | 11/2006 |
| WO | 2008131540 A1 | 11/2008 |
| WO | 2010041033 A2 | 4/2010 |
| WO | 2010092095 A1 | 8/2010 |
| WO | 2011018604 A1 | 2/2011 |
| WO | 2012025805 A2 | 3/2012 |
| WO | 2012040025 A2 | 3/2012 |

OTHER PUBLICATIONS

Ahmed M. Gomaa, Qi Qu, Russell Maharidge, Scott Nelson, Ted Reed; "New Insights into Hydraulic Fracturing of Shale Formations"; IPTC 17594; Jan. 2014; 6 pgs; International Petroleum Technology Conference; Richardson, Texas.

Ahmed M. Gomaa, Qi Qu, Russell Maharidge, Scott Nelson, ; "New Insights into Shale Fracturing Treatment Design"; SPE 167754; Feb. 2014; 15 pgs; Society of Petroleum Engineers; Richardson, Texas.

Jim Weaver, Philip Nhuyen, Stephen Ingram; "Sustaining Well Productivity"; SPE 102694; Jun. 2007; 6 pgs; Society of Petroleum Engineers; Richardson, Texas.

Jeff Hibbeler, Thomas Garcia, Dr. Nelson Chavez; "An Integrated Long-Term Solution for Migratrory Fines Damage"; SPE 81017; Apr. 2003; 11 pgs; Society of Petroleum Engineers; Richardson, Texas.

US Environmental Protection Agency; "Proceedings of the Technical Workshops for the Hydraulic Fracturing Study: Chemical & Analytical Methods"; EPA 600/R-11/066; May 2011; 122 pgs; Office of Research and Development, US Environmental Protection Agency; Washington DC.

T.W.Muecke; "Formation Fines and Factors Controlling Their Movement in Porous Media"; Journal of Petroleum Technology; Feb. 1979; 7 pgs; Exxon Production Research Co.

(56) References Cited

OTHER PUBLICATIONS

Philseok Kim, Tak-Sing Wong, Jack Alvarenga, Michael J. Kreder, Wilmer E. Adorno-Martinez, Joanna Aizenberg; "Liquid-Infused Nanostructed Surfaces with Extreme Anti-Ice and Anti-Frost Performance"; ACSNANO; Jun. 2012; 9 pgs; American Chemical Society; Cambridge, Massachusetts.
Aculon Inc; "Aculon AL-B"; Material Data Sheet; Jun. 2012; 1 pg; Aculon, Inc.; San Diego, California.
Aculon Inc; "Aculon E"; Material Data Sheet; Dec. 2012; 1 pg; Aculon, Inc.; San Diego, California.
Aculon Inc; "Aculon H1-F"; Material Data Sheet; Jun. 2011; 1 pg; Aculon, Inc.; San Diego, California.
TCI Europe NV; "Tetrakis" Safety Data Sheet; Nov. 2006; 4 pgs; TCI; Europe.
Mackenzie Company, LLC; "Metal Acetylacetonates"; Technical Data Sheet; 1 pg; MacKenzie Company, LLC; Bush, Louisiana.
Eric L. Bruner, SAMPS and Oleophobic Coating, 31, Nov. 14, 2012,NJ.
Invoices for Sales of Products to Oil Industry.
Aculon Samps and Oleophobic Coatings, ExxonMobil, Nov. 2012, pp. 1-30.
Crews, Jim, "Amazon Shale Conductivity Service—A Proposed Multi-project Development", Baker Hughes Inc., PowerPoint Presentation, No. 1, 2011.
Crews, Jim, "Amazon Shale Conductivity Service—A Proposed Multi-project Development", Baker Hughes Inc., PowerPoint Presentation, No. 2, 2011.
Aculon Inc; "Aculon AL-B"; Material Data Sheet; Dec. 2012; 1 page; Aculon, Inc.; San Diego, California.
Aculon Inc; "Aculon E"; Material Data Sheet; Jun. 2012; 1 page; Aculon, Inc.; San Diego, California.
Crews, Jim; "Amazon Shale Conductivity Service—A Proposed Multi-project Development"; Baker Hughes Inc.; PowerPoint Presentation, No. 1, 2013.
Crews, Jim; "Amazon Shale Conductivity Service—A Proposed Multi-project Development"; Baker Hughes Inc.; PowerPoint Presentation, No. 2, 2013.

* cited by examiner

METHOD OF USING SURFACE MODIFYING TREATMENT AGENTS TO TREAT SUBTERRANEAN FORMATIONS

This application claims the benefit of U.S. patent application Ser. No. 61/880,836, filed on Sep. 20, 2013; U.S. patent application Ser. No. 61/981,051, filed on Apr. 17, 2014; U.S. patent application Ser. No. 61/989,267, filed on May 6, 2014; and U.S. patent application Ser. No. 62/007,708, filed on Jun. 4, 2014; all of which are herein incorporated by reference.

FIELD OF THE DISCLOSURE

The disclosure relates to a method of treating a subterranean formation with a surface modifying treatment agent having an anchor and a hydrophobic tail.

BACKGROUND OF THE DISCLOSURE

Alternatives for enhancing the productivity of hydrocarbons from hydrocarbon producing reservoirs have included methods which increase the permeability of the formation penetrated by the well. Other methods have been directed to those which increase the oil/water production ratios within the well. Others have been drawn improved methods for inhibiting the formation of undesirable materials in the formation including water borne scales, asphaltenes, salts, paraffins, etc. Some of these methods have involved the development of well treatment chemicals for enhancing productivity.

Attention has further been focused on improving methods of stimulating formations. Since well productivity depends on the ability of a fracture to conduct hydrocarbons from the formation to the wellbore, fracture conductivity has been an important parameter in determining the degree of success of a stimulation operation. The creation and/or mobilization of reservoir "fines" during fracturing and production has been instrumental in reducing fracture conductivity and reducing reservoir permeability due to plugging of pore throats by the fines. While the use of coated particulates, such as proppants, has been successful in minimizing the generation of fines, alternatives have been sought.

Alternatives have also been sought to decrease unnecessary water production during the treatment of subterranean formations. Excessive water production has a direct effect on the productivity of the well. The amount of oil and/or gas that may be ultimately recovered from the well is decreased since the water takes the place of other fluids that may flow or be lifted from the well. This increases the cost of production from the well.

While well treatment agents have been developed for the treatment or control of the deposition of scales, salts, paraffins, and asphaltenes within the well, less than desirable results are often achieved. Alternatives have therefore been sought for improving the overall efficiency of the well by controlling the deposition of such materials. Alternatives have especially been sought for controlling the deposition of such materials in low permeability formations, such as shale and coal.

Resources have also been spent on both chemical and physical techniques for effectively reducing frictional drag created during the flow of hydrocarbons within a hydrocarbon producing reservoir.

Alternatives for reducing friction have focused on drag reduction agents. Typically, friction reduction agents are large polymers with long chains which tend to build non-Newtonian gel structures. Drag reducing gels are shear-sensitive and often require specialized injection equipment (such as pressurized delivery systems). Further, since friction reduction agents are typically highly viscous, usually no more than 10 weight percent of polymeric friction reduction agents are present in the carrier fluid. Some attention has been focused on the use of slurries or dispersions of polymers to form free-flowing and pumpable mixtures in liquid media. However, such polymers often agglomerate over time, thus making it very difficult for them to be placed in hydrocarbon liquids where reduced drag is needed.

Further alternatives for lowering the frictional drag of fluids within a well have been sought in order to enhance the productivity of hydrocarbons from the well.

It should be understood that the above-described discussion is provided for illustrative purposes only and is not intended to limit the scope or subject matter of the appended claims or those of any related patent application or patent. Thus, none of the appended claims or claims of any related application or patent should be limited by the above discussion or construed to address, include or exclude each or any of the above-cited features or disadvantages merely because of the mention thereof herein.

SUMMARY OF THE DISCLOSURE

In an embodiment of the disclosure, a method of treating a siliceous or metal (M) oxide-containing subterranean formation penetrated by a well is provided. In this method, a surface modifying treatment agent having an anchor and a hydrophobic tail is pumped into a well. The hydrophobic tail of the surface modifying treatment is directly attached to the anchor. The surface modifying treatment agent binds to a surface of the subterranean formation by attaching the anchor to the formation.

In another embodiment of the disclosure, a method of treating a siliceous or metal (M) oxide-containing subterranean formation penetrated by a well is provided. In this method, a surface modifying treatment agent having an anchor and a hydrophobic tail is pumped into a well. The hydrophobic tail of the surface modifying treatment agent is directly attached to the anchor. The surface modifying treatment agent binds to a surface of the subterranean formation by attaching the anchor to the formation. The surface modifying treatment agent is aligned as a self assembled monolayer onto the siliceous or metal oxide-containing subterranean formation.

In another embodiment, a method of treating a siliceous or metal (M) oxide-containing subterranean formation penetrated by a well is provided. In this method, a treatment fluid is pumped into a well. The treatment fluid contains a surface modifying treatment agent. The surface modifying treatment agent has an anchor and a tail. The surface modifying treatment agent binds onto the surface of the subterranean formation by forming a monolayer or multilayer assembly by self-alignment of the hydrophobic tail. Prior to pumping the treatment fluid into the well, the amount of sites for the surface modifying treatment agent to bind onto the surface of the subterranean formation are increased by pre-treating the subterranean formation with a non-aqueous fluid.

In another embodiment of the disclosure, a method of treating a siliceous subterranean formation or a metal oxide-containing subterranean formation is provided which comprises first pumping into a well, which penetrates the formation, a well treatment fluid comprising a surface modifying treatment agent having an anchor and a hydrophobic tail. The surface modifying treatment agent is a derivative of an organophosphorus acid. The surface modifying treatment agent is bound to the surface of the siliceous subterranean formation by forming a O—P—O covalent bond between the anchor and the formation. The surface modifying treatment agent is bound to the surface of the metal oxide (M)-containing formation by forming a O—P—O-M covalent bond between the anchor and the formation.

In another embodiment, a method of treating a siliceous or metal oxide-containing subterranean formation is provided in which a surface modifying treatment agent is first pumped into the formation, the surface modifying treatment agent having an anchor and a hydrophobic tail attached to the anchor, wherein the anchor is an organophosphorus acid derivative. The anchor, containing the hydrophobic tail, is then bound to the formation.

In another embodiment, a method of treating a siliceous or metal oxide-containing subterranean formation is provided wherein a surface modifying treatment agent having a hydrophobic tail and an anchor comprising an organophosphorus acid derivative is pumped into the formation. The anchor is bound to a silicon-oxo group of the siliceous formation or the metal-oxo group of the metal oxide-containing formation.

In another embodiment, a method of treating a siliceous or metal oxide-containing subterranean formation is provided wherein a surface modifying treatment agent having a hydrophobic tail and an anchor is first pumped into the formation, the surface modifying treatment agent being of the formula:

wherein:
$R_f$ is a perfluorinated alkyl group or a perfluorinated alkylene ether group of the structure:

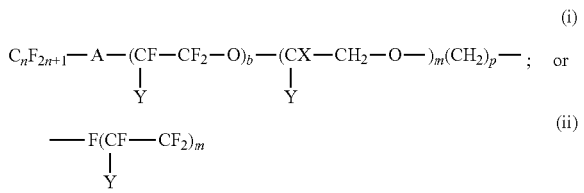

wherein:
A is an oxygen radical or a chemical bond;
n is 1 to 6;
Y is F or $C_nH_{2n+1}$;
b is at least 1;
m is 4 to 20;
p is 1 to 20; and
Z is H, F or an acid group or an acid derivative.

After the surface modifying treatment agent is pumped into the formation, the anchor is then bound to the surface of the siliceous or metal oxide-containing formation.

In another embodiment of the disclosure, a method of enhancing the productivity of a hydrocarbon producing well is disclosed wherein a surface modifying treatment agent is pumped into the well. The surface modifying treatment agent, when bound to a surface of a substrate, reduces friction of a fluid within the well.

In another embodiment of the disclosure, a method of enhancing the productivity of hydrocarbons from a well is disclosed wherein a surface modifying treatment agent is pumped into the well and friction is reduced during hydrocarbon production by the presence of the surface modifying treatment agent. During production of hydrocarbons, the surface modifying treatment agent is bound to at least a portion of a substrate.

In another embodiment, a method of reducing drag during production of hydrocarbons from a subterranean formation is disclosed. In this embodiment, a well treatment composition is pumped into the formation. The well treatment composition has a surface modifying treatment agent. The surface modifying treatment agent binds onto the surface of the formation substrate.

In still another embodiment of the disclosure, a method of reducing drag of a fluid within a well penetrating a subterranean formation is provided. In this method, a well treatment composition containing a surface modifying treatment agent is pumped into the well.

In still another embodiment of the disclosure, a method of enhancing the productivity of a hydrocarbon producing well is disclosed by bonding to a well treatment particulate a surface modifying treatment agent. The surface modifying treatment agent reduces friction of a fluid within the well.

In another embodiment of the disclosure, a method of enhancing the production of hydrocarbons from a well is provided. In this method, saturated water on the surface of a siliceous subterranean formation or a metal oxide-containing subterranean formation is reduced by pumping into the well which penetrates the formation a non-aqueous fluid. A well treatment fluid comprising a surface modifying treatment agent having an anchoring site and a hydrophobic tail is then pumped into the well. The surface modifying treatment agent binds to the surface of the subterranean formation by forming a monolayer or multi-layer assembly by self-alignment of the tail.

In another embodiment, a method of treating a siliceous or metal oxide-containing subterranean formation is provided in which a surface modifying treatment agent is pumped into the well penetrating the formation. The surface modifying treatment agent has an anchoring site and a tail. The surface modifying treatment agent binds onto the surface of the formation by forming a monolayer or multi-layer assembly by self-alignment of the tail. Prior to pumping the surface modifying treatment agent into the well, the surface of the subterranean formation is pre-treated with a non-aqueous fluid. Pre-treatment of the formation with the non-aqueous fluid increases the number of sites to which the surface modifying treatment agent may be bound.

In another embodiment, a method of producing hydrocarbons from a siliceous or metal oxide-containing subterranean formation is provided. In this method, the formation is pre-treated by pumping into the well a non-aqueous fluid. The non-aqueous fluid is capable of reducing saturated water on the surface of the formation. Water is thereby removed from the surface of the formation. After pre-treatment with the non-aqueous fluid, the surface modifying treatment agent is pumped into the well. The surface modifying treatment agent binds onto the surface of the formation through the anchor.

In another embodiment, the surface modifying treatment agent alters the surface energy of a subterranean formation.

In another embodiment, the surface modifying treatment agent stabilizes fines in a subterranean formation.

In another embodiment, the surface modifying treatment agent decreases the amount of formation solids flowed back from the surface of a subterranean formation into a production well.

In another embodiment, the surface modifying treatment agent functions as a passive anti-microbial agent to minimize or prevent the retention of water on the surface of a subterranean formation.

In yet another embodiment, the surface modifying treatment agent is used to passively inhibit or control the deposition of water borne scales onto or within a subterranean formation.

In another embodiment, the surface modifying treatment agent passively prevents deposition of organic particulates onto or within the surface of a subterranean formation.

In another embodiment, the surface modifying treatment agent is used to prevent or greatly inhibit swelling of clay within a subterranean formation.

In another embodiment, the surface modifying treatment functions as a relative permeability enhancer by increasing relative permeability to oil/gas without increasing the permeability to water.

In still another embodiment, the surface modifying treatment agent is used to minimize condensation within a retrograde condensate gas reservoir, thereby enhancing condensate production.

In yet another embodiment, the surface modifying treatment agent is used in the enhancement of the amount of flowback water and produced water from a gas or oil well following completion of a well treatment operation.

In another embodiment, the surface modifying treatment agent is used to control water condensation in the pores of a subterranean formation.

In still another embodiment, the surface modifying treatment agent is used to enhance the recovery of hydrocarbons from deposits within a tar sand formation.

In an embodiment, the surface modifying treatment agent is used in a hydraulic fracturing operation and is a component of the fracturing fluid.

In another embodiment, the surface modifying treatment agent is used in the treatment of a subterranean formation during acidizing in order to increase the penetration of acid into the formation.

Accordingly, the present disclosure relates to a surface modifying treatment agent having a hydrophobic tail and an anchor wherein the surface modifying treatment attaches to a subterranean formation through its anchor. The present disclosure further relates to the use of such surface modifying treatment agents in well treatment operations where hydrophobicity at the surface of the subterranean formation is desired.

Accordingly, the present disclosure relates to a surface modifying treatment agent having a hydrophobic and an anchor wherein the surface modifying treatment attaches to a subterranean formation through its anchor. The present disclosure further relates to the use of such surface modifying treatment agents in well treatment operations where hydrophobicity at the surface of the subterranean formation is desired.

Characteristics and advantages of the present disclosure described above and additional features and benefits will be readily apparent to those skilled in the art upon consideration of the following detailed description of various embodiments and referring to the accompanying drawings.

BRIEF DESCRIPTION OF THE DRAWINGS

The following figures are part of the present specification, included to demonstrate certain aspects of various embodiments of this disclosure and referenced in the detailed description herein.

DETAILED DESCRIPTION OF THE PREFERRED EMBODIMENTS

Figure 1:
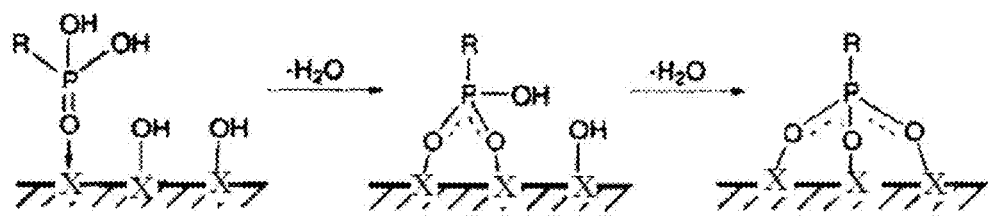
FIG. 1 depicts a schematic representation of the attachment of a surface modifying treatment agent to the surface of a subterranean formation.

Characteristics and advantages of the present disclosure and additional features and benefits will be readily apparent to those skilled in the art upon consideration of the following detailed description of exemplary embodiments of the present disclosure and referring to the accompanying figures. It should be understood that the description herein and appended drawings, being of example embodiments, are not intended to limit the claims of this patent or any patent or patent application claiming priority hereto. On the contrary, the intention is to cover all modifications, equivalents and alternatives falling within the spirit and scope of the claims. Many changes may be made to the particular embodiments and details disclosed herein without departing from such spirit and scope.

Certain terms are used herein and in the appended claims may refer to particular components, process steps or well treatment operations. As one skilled in the art will appreciate, different persons may refer to a component, a process step or a well treatment operation by different names. This document does not intend to distinguish between components, process steps or well treatment operations that differ in name but not function or operation. Also, the terms "including" and "comprising" are used herein and in the appended claims in an open-ended fashion, and thus should be interpreted to mean "including, but not limited to . . . ." Further, reference herein and in the appended claims to components and aspects in a singular tense does not necessarily limit the present disclosure or appended claims to only one such component or aspect, but should be interpreted generally to mean one or more, as may be suitable and desirable in each particular instance.

In an embodiment, the surface modifying treatment agent is characterized by a hydrophobic tail and an anchor. For purposes herein, the term "hydrophobic tail" shall refer to the hydrophobic substituent of the surface modifying treatment agent. The "anchor" refers to the non-hydrophobic portion of the surface modifying treatment agent derivative. The anchor provides the site of attachment of the surface modifying treatment agent onto the subterranean formation. For instance, the anchor may be engaged in covalently connecting the surface modifying treatment agent to a surface of the subterranean formation.

The hydrophobic tail may be directly attached to the anchor. Alternatively, the hydrophobic tail may be indirectly attached to the anchor such that an organo-functional group is between the anchor and the hydrophobic tail. For instance, the hydrophobic tail and the anchor may be separated by a hydrocarbyl group such as a saturated or unsaturated alkylene, alkenyl, alkynyl, etc.

While the tail of the treatment agent exhibits hydrophobic characteristics, it may also exhibit oleophobic properties. The treatment agent may therefore be considered to be omniphobic.

The tail of the surface modifying treatment agent is only indirectly attached to the formation substrate, through the anchor.

The tail of the surface modifying treatment agent may be aligned such that the hydrophobicity character of the treatment agent is imparted away from the surface of the subterranean formation. Water and thus aqueous fluids within the well may easily slide across the surface of the substrate carrying hydrocarbons with it as lateral adhesion of the fluid to the formation surface is reduced. Thus, the hydrophobic tail lowers water saturation and enhances recovery of water from the formation surface.

The subterranean formation, onto which the surface modifying treatment agent is bonded, may be a siliceous formation, such as sandstone, as well as a metal oxide containing formation, including carbonate formations. The formation may be enriched in clay and the metal may include alumina.

In an embodiment, the tail of the surface modifying treatment agent self-aligns with the formation substrate to form a monolayer or multi-layer assembly. It is believed that this occurs by chemical binding-induced spontaneous organization of the tail on the substrate surface.

The anchor of the surface modifying treatment agent may be a derivative of an organophosphorus acid wherein at least one of the substituent groups on the organophosphorus acid derivative is hydrophobic. In a preferred embodiment, the anchor may be a derivative of an organophosphoric acid, organophosphonic acid or organophosphinic acid.

The organo groups of the anchor may be monomeric or polymeric.

Examples of monomeric phosphoric acid derivatives are compounds or mixtures of compounds having the structure $(RO)_x$—$P(O)$—$(OR')_y$ wherein x is 1-2, y is 1-2 and x+y=3; R preferably is a radical having a total of 1-30, preferably 2-20, more preferably 6-18 carbons; R' is H, a metal such as an alkali metal, for example, sodium or potassium or lower alkyl having 1 to 4 carbons, such as methyl or ethyl. Preferably, a portion of R' is H. The organic component of the phosphoric acid (R) can be a saturated or unsaturated aliphatic group or can be an aryl or aryl-substituted moiety. At least one of the organo groups can contain terminal or omega functional groups as described below.

Examples of monomeric phosphonic acid derivatives include compounds or mixtures of compounds having the formula:

wherein a is 0-1, b is 1, c is 1-2 and a+b+c is 3; R and R" preferably are each independently a radical having a total of 1-30, preferably 2-20, more preferably 6-18 carbons; R' is H, a metal, such as an alkali metal, for example, sodium or potassium or lower alkyl having 1-4 carbons such as methyl or ethyl. Preferably at least a portion of R' is H. The organic component of the phosphonic acid (R and R") can be a saturated or unsaturated aliphatic group or an aryl or aryl-substituted moiety. At least one of the organo groups can contain terminal or omega functional groups as described below.

Examples of monomeric phosphinic acid derivatives are compounds or mixtures of compounds having the formula:

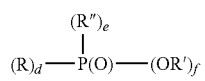

wherein d is 0-2, e is 0-2, f is 1 and d+e+f is 3; R and R" preferably are each independently radicals having a total of 1-30, preferably 2-20 carbons atoms, more preferably 6-18 carbons; R' is H, a metal, such as an alkali metal, for example, sodium or potassium or lower alkyl having 1-4 carbons, such as methyl or ethyl. Preferably a portion of R' is H. The organic component of the phosphinic acid (R, R") can be a saturated or unsaturated aliphatic group or be an aryl or aryl-substituted moiety. Examples of organo groups which may comprise R and R" include long and short chain aliphatic hydrocarbons, aromatic hydrocarbons and substituted aliphatic hydrocarbons and substituted aromatic hydrocarbons.

At least one of the organo groups can further contain one or more terminal or omega functional groups which are hydrophobic. Examples of terminal or omega functional groups include carboxyl such as carboxylic acid, hydroxyl, amino, imino, amido, thio and phosphonic acid, cyano, sulfonate, carbonate and mixed substituents.

Representative of organophosphorus acid derivatives are amino trismethylene phosphonic acid, aminobenzylphosphonic acid, 3-amino propyl phosphonic acid, O-aminophenyl phosphonic acid, 4-methoxyphenyl phosphonic acid, aminophenylphosphonic acid, aminophosphonobutyric acid, aminopropylphosphonic acid, benzhydrylphosphonic acid, benzylphosphonic acid, butylphosphonic acid, carboxyethylphosphonic acid, diphenylphosphinic acid, dodecylphosphonic acid, ethylidenediphosphonic acid, heptadecylphosphonic acid, methylbenzylphosphonic acid, naphthylmethylphosphonic acid, octadecylphosphonic acid, octylphosphonic acid, pentylphosphonic acid, phenylphosphinic acid, phenylphosphonic acid, styrene phosphonic acid, and dodecyl bis-1,12-phosphonic acid.

In addition to monomeric organophosphorus acid derivatives, oligomeric or polymeric organophosphorus acid derivatives resulting from self-condensation of the respective monomeric acids may be used.

In a preferred embodiment, the surface modifying treatment agent is of the formula $R_f$—$(CH_2)_p$—Z where Z, the anchor is H, F or an acid derivative, and the hydrophobic tail (bonded to the anchor) is a fluorine containing moiety, such as $R_f$—$(CH_2)_p$— where $R_f$ is a perfluorinated alkyl group or a perfluorinated alkylene ether group and p is 2 to 4, preferably 2.

Typically, the fluorine containing moiety has a number average molecular weight of less than 2000. Examples of perfluoroalkyl groups are those of the structure:

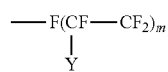

where Y is F or $C_nH_{2n+1}$; m is 4 to 20 and n is 1 to 6. A preferred oligomeric or perfluoroalkylene ether group is of the structure:

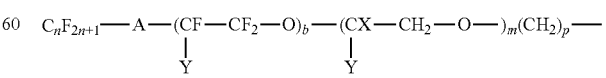

where A is an oxygen radical or a chemical bond such as a $CF_2$; n is 1 to 20, preferably 1 to 6; Y is H, F, $C_nH_{2n+1}$ or $C_nF_{2n+1}$; b is at least 1, preferably 2 to 10, m is 0 to 50, and p is 1 to 20.

In an embodiment, the surface modifying treatment agent is of the formula $R_f$—$(CH_2)_p$—Z, wherein Z is:

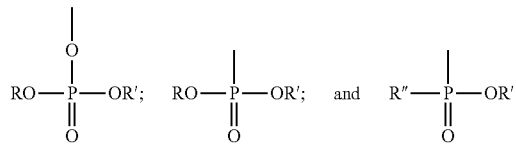

where R and R" are a hydrocarbon or substituted hydrocarbon radical having up to 200, such as 1 to 30 and 6 to 20 carbons, R can also include the perfluoroalkyl groups mentioned above, and R' is H, a metal such as potassium or sodium or an amine or an aliphatic radical, for example, alkyl including substituted alkyl having 1 to 50 carbons, preferably lower alkyl having 1 to 4 carbons such as methyl or ethyl, or aryl including substituted aryl having 6 to 50 carbons.

Where the surface modifying treatment agent contains an organophosphorus acid derivative and without being bound to any theory, it is believed that upon being pumped into the formation, a silicon atom of the siliceous subterranean formation covalently interacts with the anchor of the surface modifying treatment agent to form a Si—O—P covalent bridge. The bridges are believed to result from the condensation of hydroxyl groups on the surface of the formation with P—OH groups. Thus, exemplary bonding of the anchor and the surface of the substrate formation may be represented as —O—P—O—Si—. The hydrophobic tail of the surface modifying treatment agent is thus attached to the siliceous formation through the intermediary —O—P—O bond. The anchor of the surface modifying treatment agent thus forms a covalent bond with the hydroxyl reactive group on the surface of the siliceous formation. A complexation of the phosphoryl oxygen surface X atom is believed to form.

Upon being pumped into a metal oxide-containing formation, the anchor of the surface modifying treatment agent having an organophosphorus acid derivative is believed to covalently interact with a metal atom ("M") of the metal oxide surface of the subterranean formation to form a M-O—P covalent bridge. The bridges are believed to result from the condensation of hydroxyl groups on the surface of the formation with P—OH groups. Thus, exemplary bonding of the anchor and the surface of the substrate formation may be represented as —O—P—O-M-. The hydrophobic tail of the surface modifying treatment agent is thus attached to the metal oxide-containing formation through the intermediary —O—P—O bond. The anchor of the surface modifying treatment agent thus forms a covalent bond with the oxide reactive group on the surface of the formation. A complexation of the phosphoryl oxygen surface metal atom is believed to form.

FIG. 1 depicts a schematic representation of the formation of a tridentate phosphonate surface species by coordination and condensation to the surface of a formation, wherein X is either —Si (of a siliceous formation) or -M (of a metal oxide-containing formation).

The surface modifying treatment agents disclosed herein are effective in reducing frictional drag of a fluid within a hydrocarbon producing reservoir. The frictional drag may be created during the turbulent flow of fluids within the well. When bound to the surface of a substrate, the surface modifying treatment agents disclosed herein reduce the sliding angle between the fluid and the substrate within the well. The reduction in sliding angle may be between hydrocarbons and a substrate treated with the surface modifying treatment agent. Further, the reduction in sliding angle may be between water (aqueous phase) and a substrate treated with the surface modifying treatment agent. Fluid flow improvement has been evident in both hydrocarbon and aqueous phases.

The reduction in frictional drag within the well is thus attributable to the bonding of the surface modifying treatment agent onto the surface of the substrate. Thus, the modification of the substrate surface reduces drag and provides improved flow of hydrocarbon (or water phase) from the well. Productivity of the hydrocarbon producing well is thus enhanced by use of the surface modifying treatment agents.

The surface modifying treatment agents disclosed herein are of particular value in the reduction of frictional drag during the pumping of produced hydrocarbons from the hydrocarbon producing reservoir.

The reduction in sliding angle further is of benefit in enhancing load recovery of water by increasing the recovery of flowback water from the well after a fracturing fluid has been returned to the surface.

As used herein, the sliding angle (also known as tilting angle) is a measurement of the lateral adhesion of the drop to the substrate surface. Thus, the sliding angle of a fluid on a substrate having a surface modifying treatment agent bonded thereto is less than the sliding angle of the same fluid on the (same) substrate ("pristine unmodified substrate") which does not have the surface modifying treatment agent bonded thereto. Where the surface modifying treatment agent is bond only to a portion of the substrate, the sliding angle of the drop of fluid on the portion of the substrate having the surface modifying treatment agent bonded thereto is less than the sliding angle of the fluid on the substrate not having the surface modifying treatment agent bonded thereto.

The reduction in frictional drag during the production of hydrocarbons from the well is thus measured by a reduction in the sliding angle of the fluid with the formation surface. The reduction in adhesion bond strength results in reduced drag between the liquid and the solid surface, allowing for easier fluid flow at a given stress. The decrease in sliding angle accelerates the flow of fluid from the well by lessening the amount of fluid trapped within the formation.

In an embodiment, the sliding angle of a fluid to a substrate surface treated with the surface modifying treatment agent may be less than or equal to 60'; in some cases less than or equal to 20'; in other cases less than or equal to 10° and in some other cases less than or equal to 5°. In one instance, the sliding angle for hydrocarbons has been observed to be less than 10°. In another instance, the reduction in lateral adhesion of a fluid has been observed by a reduction in the sliding angle from 80° (non-treated substrate) to 40° (treated substrate).

The reduction in sliding angle is independent of the contact angle. The contact angle refers to the angle between a drop of the liquid and the surface of the substrate. A high contact angle reduces the normal adhesion of a liquid droplet to the solid surface due to a reduction of the liquid-solid contact area.

The contact angle is a measure of hydrophobicity. Typically, a liquid is considered to be "non-wet" or hydrophilic when the contact angle is less than 90° and "non-wetting" or hydrophobic when the contact angle is greater than 90°. A surface having a water contact angle greater than 150° is usually termed "ultra-hydrophobic" characterizing a water-repellant surface. A superhydrophobic surface may have a contact angle hysteresis less than 10°; in some cases less than 5°. When the contact angle is less than 90°, the wetting tendency of the surface modified substrate may greater when the substrate is rough versus smooth. When the contact angle is greater than 90°, the substrate may repel more when the substrate is rough.

Since hydrophobicity prevents the formation of water blocks on the surface of the substrate, the contact angle is indicative of the capillary pressure within the substrate. Whereas the contact angle is representative of static conditions, the sliding angle is representative of fluid movement downhole. No relationship can be drawn between the contact angle and sliding angle. As such, the contact angle provides no indication of the sliding angle. Improvement in frictional drag has been seen with a reduced sliding angle and a contact angle less than or equal to 20°. Further, improvements in frictional drag have been observed with a reduced sliding angle and a contact angle greater than or equal to 120°. For instance, the effectiveness of surface modifying treatment agents on substrate surfaces to reduce frictional drag has been seen with fluids exhibiting a contact angle less than 20° and a sliding angle less than 20° and a contact angle greater than 120° and a sliding angle less than 20°.

The surface modifying treatment agent may be pumped into the formation as a component of a well treatment fluid. The well treatment fluid may be pumped into the formation any time during the well treatment operation. In an embodiment, the well treatment fluid may be a fracturing fluid, pad fluid, acidizing fluid, etc.

The concentration of the surface modifying treatment agent in the well treatment fluid is typically between from about 0.01% to 100% or more typically between from about 0.1% to about 20% (v/v).

The surface modifying treatment agent may be dissolved or dispersed in a diluent to form a solution. Suitable diluents include alcohols such as methanol, ethanol or propanol; aliphatic hydrocarbons such as hexane, isooctane and decane, ethers, for example, tetrahydrofuran and dialkylethers such as diethylether. Diluents for fluorinated materials can include perfluorinated compounds such as perfluorinated tetrahydrofuran.

The surface modifying treatment agents disclosed herein may alter the surface energy of the formation being treated.

The attachment of the anchor of the surface modifying treatment agent onto the formation prevents spalling of fines. Migration of fines into producing areas of the formation is minimized and in-situ fines generation is minimized or stabilized.

The hydrophobic nature of the tail further alters the wettability of the formation surface. The self-assembled hydrophobic monolayer covalently attached to the formation surface lowers the water saturation and enhances recovery of water from the formation surface.

Particulates of a weakly consolidated, semi consolidated or unconsolidated formation may further be consolidated by use of the surface modifying treatment agents disclosed herein. The reaction of the anchor of the treatment agent on the surface formation prevents or minimizes the influx of fluids into the formation.

Upon being pumped into the formation, the surface modifying treatment agent may enter into the pore spaces of the formation. Multiple interactions of molecules of the surface modifying treatment agent with formation particulates cause aggregation or agglomeration of formation particulates. Further, it is believed, that the reactivity of the surface modifying treatment agent with formation surfaces or portions of formation surfaces creates an aggregation or agglomeration of the hydrophobic tails in near proximity to the formation surface. The use of the surface modifying treatment agents as a means to consolidate particulates of the formation is particularly effective in the treatment of shale formations.

The consolidation further provides stability to the formation since aggregated particulates allow fluid to flow back through the pumped fluids without flowing formation solids back to the surface. This phenomenon is attributable to the anchoring of the surface modifying treatment agent onto the surface formation and to the alignment of the tail of the treatment agent enabling limited contact-time of the fluid with formation surface.

In another embodiment, the swelling, dispersement, disintegration, migration and otherwise disruption or inhibition of clay in oil and gas producing formations may be decreased by use of the surface modifying treatment agent and native fluid production may dislodge fines in a pore throat. The degree of swelling, as well as migration of clay particles, is often increased when formation clays are disturbed by foreign substances, such as aqueous well treatment fluids. Like fines formation, the swelling and migration of formation clays presents problems during stimulation and well completion, such as by increasing the bulk volume of treatment fluids. For instance, clays, in the presence of well treatment fluids, often expand and may be disrupted by becoming unconsolidated, thereby producing particles which migrate into a borehole. The presence of the hydrophobic tail on the surface modifying treatment agent prevents or inhibits the swelling and migration of formation clay particles. Thus, by obstruction of formation capillaries, swelling and migration of formation clay may be reduced or prevented by the use of the surface modifying treatment agent disclosed herein. Loss of formation permeability is thus minimized to create little, if any, reduction in the flow rate of hydrocarbons.

In a preferred embodiment, the surface modifying treatment agent is used in the treatment of a shale formation or a clay-rich formation in order to coat the surface of the formation to reduce water absorption or imbibement of water in order to reduce swelling.

The presence of the hydrophobic tail of the surface modifying treatment agent impedes the permeability of water in water saturated zones of a producing formation without reducing relative permeability to oil or gas. Since relative permeability is dependent on the pore structure and size, wettability of the formation surface and capillary pressure of the water within the formation, in some instances, such as where the formation is characterized by larger pores, water and oil permeability may be improved. With small pore surfaces, the hydrophobic tail of the surface modifying treatment agent attached indirectly to the mineral surface of the formation through the anchor is relatively non-damaging to oil permeability. For example, it is particularly effective in oil saturated sandstone formations while exhibiting the ability to decrease water permeability substantially in water saturated zones.

The surface modifying treatment agents disclosed herein may also be used in the treatment of rich gas or retrograde condensate gas reservoirs and thus presents value to retrograde gas fields by increasing condensation production. In such reservoirs, heavy end fraction of gases may be precipitated in liquid form from solution in the gas as the reservoir pressure within the well is decreased below the dew point of the gas. Condensed liquid drains downward by gravity when its saturation exceeds the irreducible condensate saturation. With retrograde gases, liquids cannot be reabsorbed into the gas phase even if pressure is increased by a rate reduction. When a well treatment fluid containing the surface modifying treatment agent disclosed herein is pumped into a retrograde gas well, the permeability of the formation may be maintained, and condensate dropout minimized. Thus, in turn, minimizes the possibility of the formation of an emulsion between precipitated hydrocarbons and the invading water from the aqueous based well treatment fluid. The pressure below the dew point of the hydrocarbons may therefore be maintained. By enhancing the permeability of the formation to liquid hydrocarbons, loss of light condensate liquids is minimized and light condensate liquids may therefore be more readily displaced.

The surface modifying treatment agents disclosed herein may also be used to enhance load recovery of water. The presence of the hydrophobic tail on the surface modifying treatment agent provides increased recovery of flowback water from the well after fracturing fluid has been returned to the surface. In some instances, flowback water may be as low as 25%, while in some cases can be as high as 75%, of the volume of fluid that was injected into the well. This application is particularly useful in shale fractures having a complex of narrow fractures with limited conductivity where a low range of fluid recovery values (30% or less) are typically experienced. This lack of recovery is often interpreted as causing formation damage (from residual polymer gels residues and high capillary pressure), resulting in lowered gas/oil production. Methods as described in this invention that results in increased water recovered from the shale-type formation can thus be interpreted to reduce formation damage, and hence improve well productivity. For instance, in a typical fracturing job on a Marcellus shale formation, 20,000 to 150,000 barrels of fracturing fluid may be pumped into the well, depending upon the number of stages pumped.

The hydrophobic nature of the surface modifying treatment agent may further serve to control water condensation in the pores of a near wellbore region of a permeable formation. Often, the liquid zone formed from the condensation of hydrocarbons within a gas reservoir close to the wellbore hampers gas flow, reducing the productivity of the well the formation of "water block" or "water bank" zones. Condensation of water in the pores of a near wellbore region of a permeable formation may be decreased by the presence of the surface modifying treatment agent. Fluid transfer and water flux through the pores of the near wellbore region of the formation may be controlled by inhibiting the formation of a water bank by the hydrophobic tail of the surface modifying treatment agent.

In an embodiment, the well treatment fluid may be a component of a fracturing fluid, pad fluid, acidizing fluid, etc. When used in an aqueous fracturing fluid, the surface modifying treatment is preferably dispersed within the fluid.

The surface modifying treatment agent may further be used to enhance the productivity of injection wells in a water flood operation. Field water or field brine pumped through one or more injection wells drilled into the formation causes displacement of oil within the formation and improvement in hydrocarbon recovery. In an embodiment, one or more injection wells may be spaced apart from each other and perforated so as to be able to direct the injection fluid containing the surface modifying treatment agent in the direction of one or more producing wells and into the hydrocarbon-bearing formation. The presence of the hydrophobic tail on the surface modifying treatment agent enhances direction of water flow within the matrix of the subterranean formation. As the injection fluid is pumped into the formation, the surface modifying treatment agent in the well treatment fluid cause the water to be redirected through the formation. In so doing, hydrocarbons are displaced toward the producing well or wells. Thereafter, hydrocarbons will be produced from the producing well to the surface.

The surface modifying treatment agent disclosed herein may further be used in the treatment of tar sand formations. Conventional recovery of hydrocarbons from heavy oil deposits within the tar sand is generally accomplished by steam injection to swell and lower the viscosity of the crude to the point where it can be pushed toward the production wells. The heavy oil is immobile at reservoir temperatures and therefore the oil is typically heated to reduce its viscosity and mobilize the oil flow. The surface modifying treatment agent enhances oil flow and thus recovery of oil from tar sand by minimizing the flow of water into the deposits. The hydrophobicity of the surface modifying treatment agent further minimizes the interference of steam in the removal of oil from tar sand deposits.

In another embodiment, the surface modifying treatment agent is used in an acidizing operation in order to increase the penetration of acid into the formation. Since the hydrophobic tail of the surface modifying treatment agent is either on or in close proximity to the formation face, reaction of acid with the formation surface is retarded. The reactive acid may therefore etch the formation in more distant areas from the port of entry of the treatment fluid. Deeper acid penetration in the well may therefore result.

Further, the surface modifying treatment agent may be used to shut-off water into a formation. In this regard, the surface modifying treatment agent finds particular applicability in the treatment of matrix formations having finer grained particles between larger rock particles or finer grained particles in which the larger particles are embedded. The hydrophobic tail on the surface modifying treatment agent reduces the influx of water into matrix formations characterized by low permeability. Further, matrix formations produce a large amount of water due to an influx of water into the wellbore. Over time, the amount or percentage of produced water may increase resulting in a corresponding decrease in the production of desired hydrocarbons, eventually rendering further production of hydrocarbons from the well uneconomical. The hydrophobic tail indirectly attached to the formation blocks the flow of water into the formation or otherwise abates the influx of water. This results in increased rates in hydrocarbon production and ultimately increases recoverable reserves.

In an embodiment, the surface modifying treatment agent may function as a passive anti-microbial agent in order to counter bacterial growth principally caused by nitrogen and/or phosphorus in formation water or within fluid injected into the formation. The hydrophobic tail of the surface modifying treatment agent repels the fluid from the formation and thus decreases contact time of the fluid in the formation. This prevents the build-up of aerobic bacteria, anaerobic bacteria and other microbials.

In another embodiment, the surface modifying treatment agent may be used to passively inhibit, control, prevent or remove scale deposition onto or within the formation. The hydrophobic tail of the surface modifying treatment agent minimizes or decreases the ability of such materials to adhere to the formation. This may be attributable to the hydrophobic nature of such minerals scales as calcium, barium, magnesium salts and the like including barium sulfate, calcium sulfate, and calcium carbonate scales. The composites may further have applicability in the treatment of other inorganic scales, such as metal sulfide scales, like zinc sulfide, iron sulfide, etc. Since such scales tend to plug the pore spaces and reduce the porosity and permeability of the formation, the surface modifying treatment agent described herein improves the permeability of the formation.

When coated onto the substrate of the formation being treatment, the bulky nature of the tail of the surface modifying treatment agent prevents or controls deposition of organic particulates onto the formation substrate, fines are returned to the surface with the fluid. In addition, bonding of the surface modifying treatment agent onto the formation minimizes binding sites for such organic particulates. Thus, the surface modifying treatment agents may be used to control or prevent the deposition of organic materials (such as paraffins and/or asphaltenes) within or onto the formation. Such solids and particulates are known to negatively impact the overall efficiency of completion of wells and, like scale inhibitors, can precipitate from produced water and create blockages in flow paths within the formation. The formation and deposition of such unwanted contaminants decrease permeability of the subterranean formation, reduce well productivity, and, in some cases, may completely block well tubing.

The surface modifying treatment agent may further be introduced into a non-hydrocarbon producing well in order to dispose of salt water. This application may be used in those instances where water flooding operations are not in use. In this operation, the salt water may be disposed of by injecting the water into permeable low pressure strata below the fresh water level in a salt water disposal well.

The bonding of a surface modifying treatment agent onto a subterranean formation is enhanced by first pre-treating the formation. In the pre-treatment, a non-aqueous fluid is first pumped into the well which penetrates the formation. The surface modifying treatment agent is then pumped into the well. The access to the sites for the surface modifying treatment agent to bind onto the surface of the subterranean formation is facilitated by pre-treatment of the subterranean formation with the non-aqueous fluid.

Any non-aqueous solvent capable of lowering water saturation and enhancing the recovery of water from the formation surface may be used. Typically, the non-aqueous fluid contains no more than 18 carbon atoms and may be composed of more than one solvent.

Exemplary of non-aqueous solvents are alcohols, such as a $C_1$-$C_6$ primary, secondary or tertiary alkanol like methanol, ethanol and propanol; hydrocarbons such as paraffin oil, mineral oil, and a $C_4$-$C_{18}$ hydrocarbon solvent like hexane, isooctane, decane, xylene, n-pentane, n-hexane, etc.; halogenated hydrocarbons such as chlorinated or fluorinated hydrocarbons like methylene chloride; glycols like ethylene glycol and methylbutyl ethylene glycol; $C_3$-$C_{18}$ ethers including heterocyclic ethers like tetrahydrofuran and alkyl ethers such as monobutyl ether and dialkyl ethers like diethylether monobutyl ether; glycol ethers like dipropylene glycol methyl ether; perfluorinated compounds such as perfluorinated tetrahydrofuran; and mixtures thereof.

In a preferred embodiment, the non-aqueous fluid is a mutual solvent (defined as any chemically mutually soluble solvent in hydrocarbons and water) such as glycol ethers and ethylene glycol monobutylether.

One or more stages of non-aqueous fluids may be pumped into the well prior to pumping of the surface modifying treatment agent. Where more than one stage of non-aqueous fluid is pumped into the well prior to pumping of the surface modifying treatment agent, each stage may be composed of the same non-aqueous fluid or different non-aqueous fluids.

Thus, for example, the first and second stages of non-aqueous fluids pumped into the well may both be a hydrocarbon or the first stage may be an alcohol and the second stage a hydrocarbon. Where more than two stages of non-aqueous fluids are pumped into the well prior to pumping of the surface modifying treatment agent, all or more than one of the stages may be composed of the same non-aqueous fluid or each stage may be composed of different non-aqueous fluids and so on.

Prior to pumping the non-aqueous fluid into the well or in between pumping of different stages of non-aqueous fluids into the well, the surface of the formation may be further treated with a salt solution, such as an alkaline solution like sodium hydroxide or potassium hydroxide.

Where the formation is treated with a salt solution, the formation is preferably treated with one or more subsequent stages of non-aqueous fluid prior to pumping of the surface modifying treatment agent into the well.

Preferred embodiments of the present disclosure thus offer advantages over the prior art and are well adapted to carry out one or more of the objects of this disclosure. However, the present disclosure does not require each of the components and acts described above and are in no way limited to the above-described embodiments or methods of operation. Any one or more of the above components, features and processes may be employed in any suitable configuration without inclusion of other such components, features and processes. Moreover, the present disclosure includes additional features, capabilities, functions, methods, uses and applications that have not been specifically addressed herein but are, or will become, apparent from the description herein, the appended drawings and claims.

All percentages set forth in the Examples are given in terms of weight units except as may otherwise be indicated.

EXAMPLES

Example 1

Berea sandstone cores measuring 1.0" in diameter and 1.5" in length and having nitrogen permeability of 200 and were evacuated with air and then saturated with either 2% aqueous solution of potassium chloride (KCl) or ISOPAR™ paraffinic fluid of ExxonMobil Chemical Company. The core was then installed in a hydrostatic core holder apparatus. Approximately 200 psi back pressure was applied at the exit end and approximately 1,000 psi confining stress (overburden pressure) was applied around the entire cylinder. The confining stress pressure simulated stress in the downhole formation. When saturated with KCl, a flow of the paraffinic fluid was flowed through the core in order to establish a base line permeability to the core to the oil followed by a flow of KCl solution to establish a baseline permeability to water. When saturated with the paraffinic fluid, a flow of the KCl solution was flowed through the core in order to establish a base line permeability to the core to the water followed by a flow of paraffinic fluid to establish a baseline permeability to oil. Pressure drop was measured across the entire length of the core and was used to calculate individual baseline permeability to water and to oil.

A five pore volume of a neat fluid of AL-B, 2% of an organophosphonate having a hydrocarbon polymeric hydrophobic tail in an organic solvent blend, commercially available from Aculon, Inc., was then injected into the core and allowed to soak for about one hour. After treatment, oil is flowed first and a comparison of permeability to oil right after treatment versus permeability to oil before treatment was made. After oil, water was flowed measuring permeability of water at residual oil after treatment and this was compared to the water right before treatment. As such, the oil at irreducible water saturation and the water at residual oil saturation were measured and the percent retention in permeability was then determined.

Figure 2:
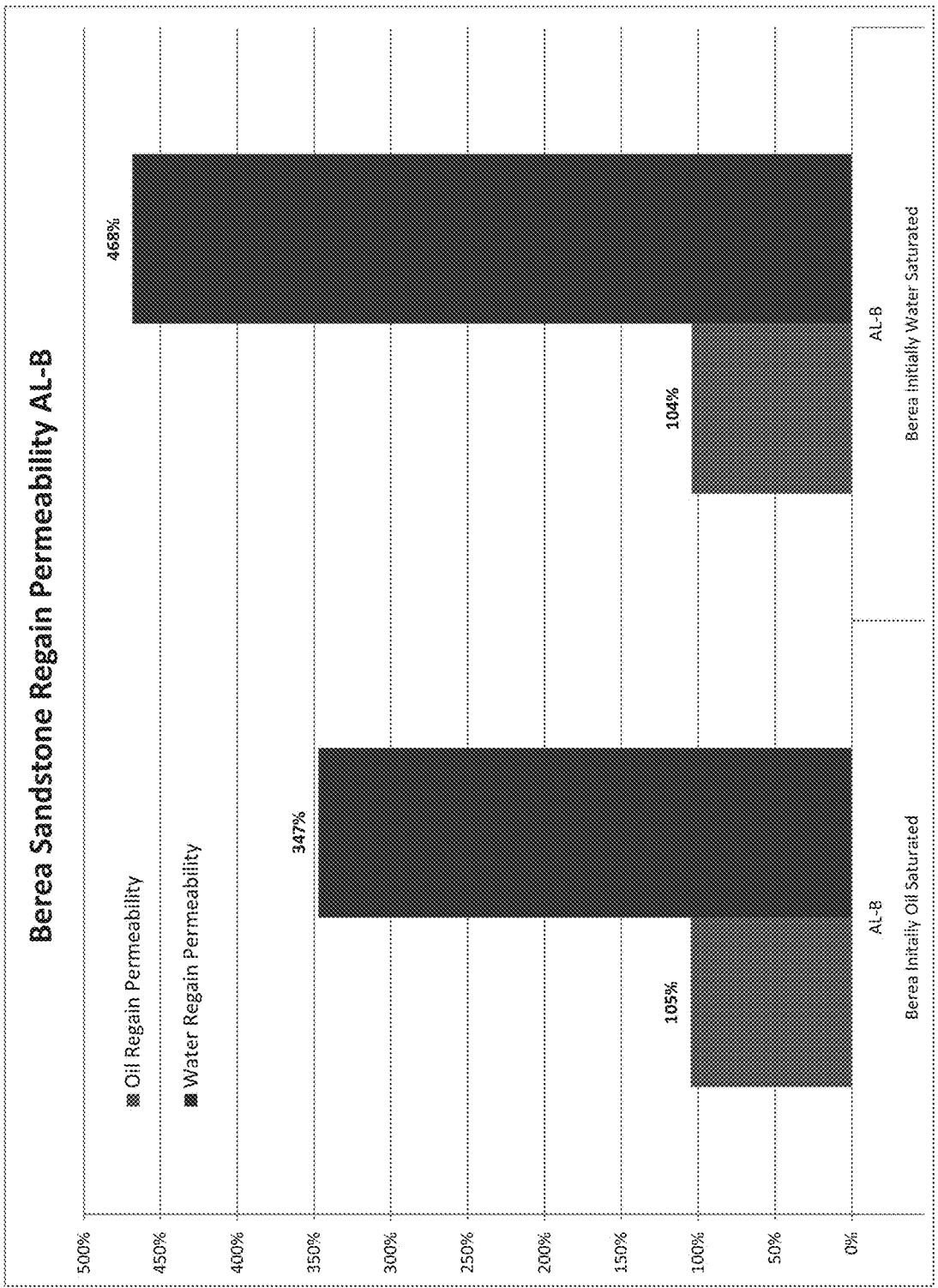
FIG. 2 illustrates regain permeability in a Berea core by use of the surface modifying treatment agent described herein.

FIG. 2 illustrates the percent regain of the testing. While water regain permeability was very high (in excess of 300% and 468%), oil regain permeability was slightly exceeded 100% both Berea samples. FIG. 2 establishes that treatment of the core with an organophosphonate treatment agent containing a hydrophobic tail provides an improved rate of return of fluids from the well. The data demonstrates that the organophosphonate treatment agent stabilizes fine movement since decreased permeability would be noted if movement of fines existed. Further, FIG. 2 illustrates that use of the organophosphonate treatment agent would reduce solids flowback to the surface in light of the increase in permeability. Further, the lack of reduced permeability evidences minimal clay swelling. Further, the ability to readily produce water by use of the organophosphonate treatment agent provides for minimal residence time for microbes, scales as well as organic deposits such as asphaltenes. The increase in the capacity of the reservoir to transmit to transmit hydrocarbons illustrates enhancement in recovery of hydrocarbons from deposits within tar sands. Further, the hydrophobic coating of the formation with the organophosphonate further provides for inhibition in the reactivity of acid such that deeper penetration of acid into the formation is possible.

Example 2

Permeability testing was performed on a synthetic core composed of 20-40 mesh gravel, 100 mesh sand and 325 mesh silica. The 325 mesh silica mimics fines in formations. The synthetic core was 1.0" in diameter and 2.0" in length and having nitrogen permeability of 100 and was saturated with 2% aqueous solution of potassium chloride (KCl). The core was then installed in a hydrostatic core holder apparatus. Approximately 200 psi back pressure was applied at the exit end and approximately 1,000 psi confining stress (overburden pressure) was applied around the entire cylinder. The confining stress pressure simulated stress in the downhole formation. ISOPAR™ paraffinic fluid was then flowed through the core in order to establish a base line permeability to the core to the oil. When saturated with the paraffinic fluid, a flow of the KCl solution was flowed through the core. Pressure drop was measured across the entire length of the core and was used to calculate individual baseline permeability to water and to oil.

A five pore volume of a neat fluid of AL-B was then injected into the core and allowed to soak for about one hour. After treatment, paraffinic fluid was flowed through the core and permeability of oil at irreducible water saturation was then measured and the percent retention in permeability was then determined. After oil, water was flowed measuring permeability of water at residual oil after treatment and this was compared to the water right before treatment. As such, the oil at irreducible water saturation and the water at residual oil saturation were measured and the percent retention in permeability was then determined.

Figure 3:
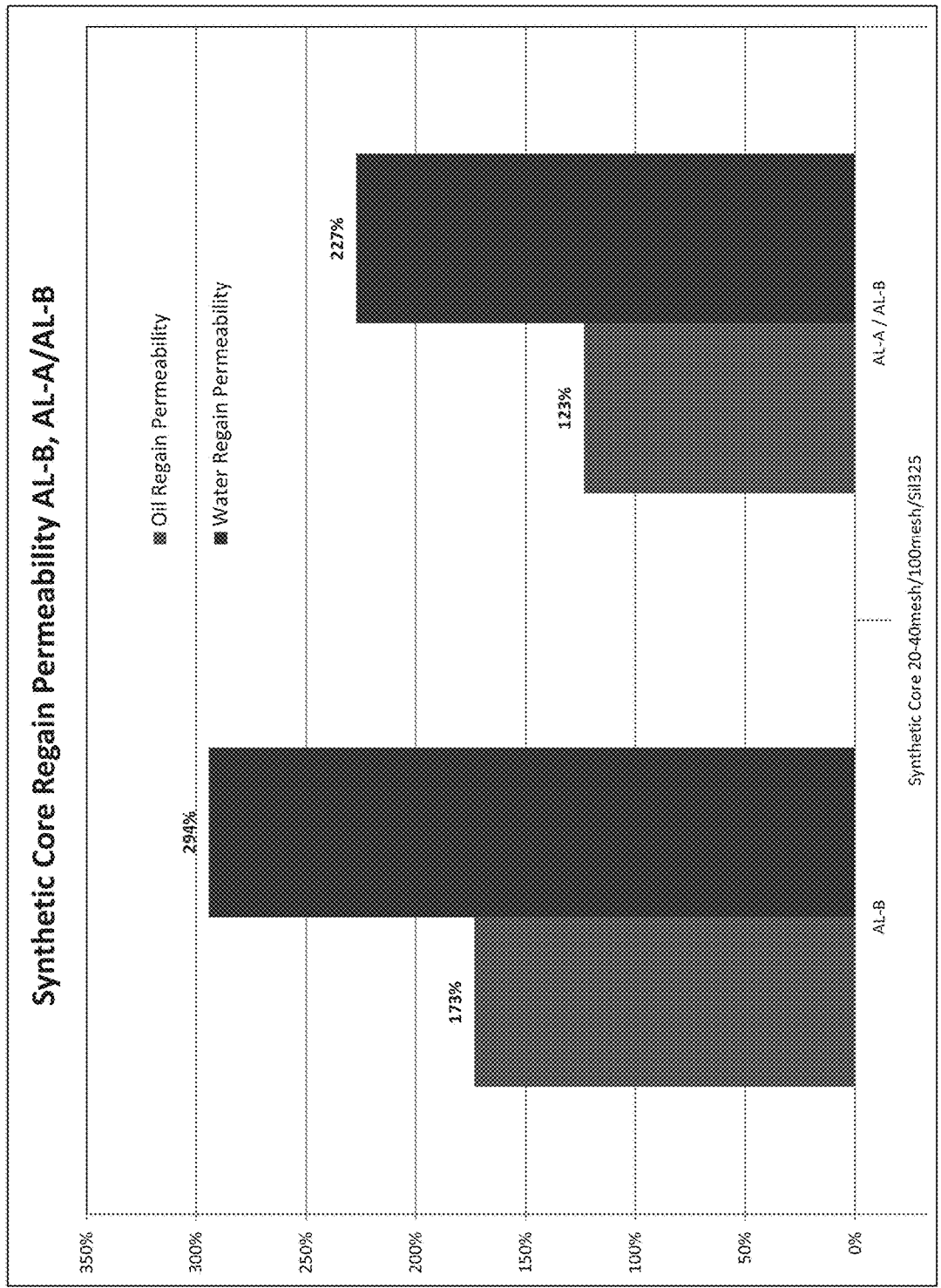
FIG. 3 illustrates retention in permeability in a synthetic core containing 325 mesh silica when using the surface modifying treatment agent described herein.

The data is illustrated in FIG. 3 wherein the lack of reduction in permeability demonstrates the lack of fines movement.

Example 3

The effect of surface modifying treatment agents on water and hydrocarbons was determined for three substrates. Each of the surface modifying treatment agents had a hydrophobic tail and an anchor. The anchor through a covalent bond secures the surface modifying treatment agent onto the surface of the substrate. The surface modifying treatment agents were H1-F and Aculon E [comprising 2% of a treatment agent having a transition metal (anchor) linked to a fluorinated hydrocarbon tail in an organic solvent] and AL-B [comprising 2% of an organophosphonate (anchor) having a hydrocarbon polymeric hydrophobic tail in an organic solvent blend]; all commercially available from Aculon, Inc. Aculon-E and AL-B exhibited hydrophobic and oleophobic properties while H1-F exhibited hydrophobic properties only.

The surface modifying treatment agent was sprayed onto a glass slide (having a more homogeneous surface than natural rock), a core of Ohio sandstone and a core of Berea sandstone to provide a coating approximately 1 to 10 nm thick. The cores of Ohio sandstone and Berea sandstone were approximately 1.0" in diameter and 1.5" in length. The anchor of the surface modifying treatment agent reacted with oxides on the surface of the substrate. As a result, the surface modifying treatment agent was covalently bonded onto the surface of the substrate. The samples were then kept in an oven at 150 F until completely dry to remove the solvent. After being modified, all of the substrate surfaces were hydrophobic. Contact angle and sliding (or roll-off) angle were then determined and used as the primary measure of performance. The contact angle demonstrates wettability characteristics of the surface while the sliding angle and contact angle hysteresis characterized the ease of fluid roll off from the substrate.

Glass Slide.

Table I show the contact angles obtained with both water and ISOPAR-L™ paraffinic fluid (Isopar-L simulated oil). As demonstrated, AL-B was the most oleophobic and the amount of hydrophobicity imparted by each of the three surface modifying treatment agents was about the same. Glass treated with Aculon E had a sliding angle of 20°, while modified surfaces using H1-F and AL-B exhibited a large contact angle hysteresis with water. Drops of fluids stayed pinned on the surface even at a 90° rotation angle. The sliding angle using Isopar-L was 8 to 10° when H1-F was used as the surface modifying treatment agent, 30° for AL-B and little roll off for Aculon E. In this last case the hysteresis between advancing (liquid drop front) and receding (rear end) angles was large and the drop stay pinned on the surface of the modified glass. The wettability behavior is set forth in Table I and demonstrates Aculon-E to be more effective as surface modifying treatment agent to move water while H1-F was more effective in the flow of oil.

TABLE I

| Surface Modifier | Contact Angle (Water) | Contact Angle (IsoparL) |
|---|---|---|
| None | 36 | Wetting state |
| H1-F | 95 | 10 |
| E | 83 | 48 |
| AL-B | 97 | 58 |

Ohio Sandstone.

The contact angle and sliding angle measurements for Ohio sandstone are demonstrated in Table II below:

TABLE II

| Surface Modifier | Fluid | Surface Energy (mJ/m$^2$) | Work of Adhesion (mJ/m$^2$) | Sliding Angle (°) |
|---|---|---|---|---|
| H1-F | Water | 1.67 ± 0.01 | 11.10 ± 0.01 | Pinning effect |
| H1-F | IsoparL | NA | NA | Goes through* |
| E | Water | extremely low, cannot be calculated | 7.81 ± 0.01 | 17-20 |
| E | IsoparL | 28.12 ± 0.02 | 58.20 ± 0.03 | Goes through** |
| AL-B | Water | 1.67 ± 0.01 | 11.10 ± 0.01 | Pinning effect |
| AL-B | IsoparL | 12.49 ± 0.04 | 37.34 ± 0.06 | Goes through*** |

*surface modified glass had a very low sliding angle (7-10)
**IsoparL drop stayed pinned on E modified glass
***roll-off angle of IsoparL on AL-B modified glass was 30°

In the case of Aculon H1-F and AL-B, the contact angle was 147° and the surface energy was 1.67 mJ/m$^2$. However, hysteresis between advancing and receding angles in the range of 20 to 40° leading to a pinning effect and retention of the water drop even where the sample was rotated at 90°. Adsorption studies also demonstrated that when the sandstone was treated, water did not flow through the stone. After 30 minutes the water drop was still on surface of the modified sandstone, while for control Ohio Sandstone the water passed through instantaneously. When Aculon E was used as the surface modifying treatment agent, the water contact angle with the surface of the rock was 153°. The surface energy was very low. In this case the interaction between the support and water was less than that of the dispensing pipette tip and water. The drop had to be big enough so that its weight allowed it to be removed from the pipette tip. In this case, a sliding angle of 17-20° was observed. As the sample was left flat, water flowed more easily off the surface of the rock with increase in drop size. No adsorption of the water drop was left on the surface of the rock.

Oleophobicity of the surface treated with the surface modifying treatment agent was determined with Isopar-L. When the surface modifying treatment agent was H1-F, Isopar-L was observed to go through the surface instantaneously. The contact angle with AL-B modified sandstone was 60°. The adsorption through the sandstone core was slower than in the case of H1-F but the core was observed to be very permeable to Isopar-L. The surface properties of modified sandstones are presented in Table II. (The surface energy and work of adhesion represent how easy it is to remove a drop of the fluid perpendicular to the surfaces while the sliding angle represents the ease of moving the fluid tangentially to the surface and represents the movement of the fluid through a porous media.) The data shows similar conclusions as observed with modified glass slides, i.e., the movement of water was easier when the surface modifying treatment agent was Aculon E while H1-F provided a better flow of hydrocarbons (due to low surface energy of the surface). It is likely that a reduction in the roughness of the surfaces contributes to a decrease in drag and improved flow of hydrocarbon.

TABLE III

| Surface Modifier | Fluid | Surface Energy (mJ/m$^2$) | Work of Adhesion (mJ/m$^2$) | Sliding Angle (°) |
|---|---|---|---|---|
| H1-F | Water | 1.67 ± 0.01 | 11.10 ± 0.01 | Pinning effect |
| H1-F | IsoparL | NA | NA | Goes through* |
| E | Water | extremely low, cannot be calculated | 7.81 ± 0.01 | 17-20 |
| E | IsoparL | 28.12 ± 0.02 | 58.20 ± 0.03 | Goes through** |
| AL-B | Water | 1.67 ± 0.01 | 11.10 ± 0.01 | Pinning effect |
| AL-B | IsoparL | 12.49 ± 0.04 | 37.34 ± 0.06 | Goes through*** |

*surface modified glass had a very low roll-off angle (7-10°)
**Isopar-L drop stayed pinned on E modified glass
***sliding angle of Isopar-L on AL-B modified glass was 30°

Berea Sandstone.

Berea sandstone showed the same hydrophobic behavior as the Ohio Sandstone. No contact angle could be measured using Isopar-L. For oil the absorption was very quick. Absorption of AL-B was a little slower than H1-F. The hydrophobic properties and surface energy results are presented in Table IV where it is illustrated that surfaces modified with Al-B and H1-F exhibited low surface energy.

TABLE IV

| Surface Modifier | Average Contact Angle | Surface Energy | Work of Adhesion (mJ/m$^2$) |
|---|---|---|---|
| H1-F | 122.83 | 10.15 | 33.33 |
| AL-B | 143.11 | 2.5 | 14.58 |

As illustrated in Tables I, II, III and IV, substrate surfaces modified with the described surface modifying treatment agents provide for improved flow of produced hydrocarbons.

Example 4

Longevity studies were undertaken using glass slides and modified glass slides kept in brine (2% KCl, 11.6 ppg CaCl$_2$, 19.2 ppg ZnBr$_2$, 12.5 ppg NaBr, 13 ppg CaBr$_2$/CaCl$_2$) for five months and sandstone kept in produced water for one month. Atomic Force Microscopy (AFM) was used to determine the smoothness of the surfaces. Several glasses slides were kept in the same fluid and every month one slide was removed and analyzed. The slide was then washed with deionized water and dried and then tested for hydrophobicity. Surfaces modified with H1-F and Aculon E demonstrated good stability in brine after five months. In the case of AL-B, a decrease in the contact angle through time was observed. In the five month period, the sliding angle for the H1-F modified substrate decreased up to 4°.

The methods that may be described above or claimed herein and any other methods which may fall within the scope of the appended claims can be performed in any desired suitable order and are not necessarily limited to any sequence described herein or as may be listed in the appended claims. Further, the methods of the present disclosure do not necessarily require use of the particular embodiments shown and described herein, but are equally applicable with any other suitable structure, form and configuration of components.

Example 5

An effective method for depositing self-assembled monolayers from a surface modifying treatment agent onto an oxide surface was first determined. The surface modifying treatment agent had a hydrophobic tail and an anchoring site. The anchoring site through a covalent bond secured the surface modifying treatment agent onto the surface of the substrate. The surface modifying treatment agent exhibited hydrophobic properties and was commercially available from Aculon, Inc. as H1-F [comprising 2% of a treatment agent having a transition metal (anchor) linked to a fluorinated hydrocarbon tail in an organic solvent]. In the first test, Test A, a clean and dry glass slide was directly modified with the monolayer by spraying the surface of the slide with H1-F. In the second test, Test B, the surface of a glass slide was wet with a thin film of water. H1-F was then applied onto the coating. In the third test, Test C, the surface of the glass slide was wet with a thin film of ISOPAR-L™ paraffinic fluid, a product of ExxonMobil Chemical Company. The ISOPAR-L simulated oil wet reservoirs. H1-F was then applied onto the slide.

After applying the nanocoating, each of the samples was then left for about five minutes for the reaction to occur on the surfaces. The surface was then dried. A drop of water was then put onto the surface. If the drop spread on the surface then the quality of the bonding was concluded to be unacceptable. If the sample demonstrated hydrophobicity, then the coating was concluded to be successful. Test A demonstrated hydrophobicity while Test B and Text C did not. It was concluded that the glass slides were not modified successfully and did not enhance the ability of the surface modifying treatment agent to adhere onto the surface.

When Test B was repeated and the slide was kept exposed to air for a period of time in order for complete evaporation of the liquid to occur. HF-1 was then applied to the glass slide. The surface modified glass was then noted to exhibit hydrophobicity. No interaction of the oily surface of Test C was observed. It was concluded that binding efficiency of the monolayer would be very low when the surface of the rock being treated was exposed to oil or a large amount of water. It was further concluded that the surface of the rock being treated would need to be dry and clean from organic material as well as other contaminants in order for the surface modifying treatment agent to have the best access to the binding site of the rock.

Example 6

Two Berea sandstone cores measuring 1.0" in diameter and 1.5" in length were used. The first core had a nitrogen permeability of 804 md and the second core had a nitrogen permeability of 773 md. Both of the cores exhibited a porosity of about 20%. Both of the cores were evacuated with air and then saturated with either 2% aqueous solution of potassium chloride (KCl) or ISOPAR™ paraffinic fluid. The cores were then installed in a hydrostatic core holder apparatus. Approximately 200 psi back pressure was applied at the exit end and approximately 1,000 psi confining stress (overburden pressure) was applied around the entire cylinder. The confining stress pressure simulated stress in the downhole formation.

The first core was not subjected to a preflush but was saturated in oil. Initial permeability to oil and water was determined in the production direction. First the permeability to water at residual oil was determined by flowing water through the core until differential pressure was stabilized. Oil was then flowed through the core and the permeability to oil was determined until there was irreducible water at stable differential pressure. The core was then treated with a surface modifying treatment agent exhibiting both hydrophobic and oleophobic properties and commercially available from Aculon, Inc. as Aculon-E [comprising 2% of a treatment agent having a transition metal (anchor) linked to a fluorinated hydrocarbon tail in an organic solvent] in the injection direction. Finally, permeability to oil and water was re-established in the production direction. Both permeability to water and oil cycles were repeated and determined. Then % regain permeability was calculated.

The second core was preflushed by saturating it in 2% KCl. Initial permeability to oil and water was determined in the production direction. Permeability to water at residual oil was first determined by flowing water through the core until differential pressure was stabilized. Oil was then flowed through the core until irreducible water was established at stable differential pressure. Permeability was then determined. This was followed by an injection of 10 pore volume of methanol as the pre-flush flowed through the core. The sample was then treated with the Aculon-E in the injection direction. Permeability to oil and water was then re-established in the production direction. Both permeability to water and oil cycles were repeated and determined. The % regain permeability was then calculated.

Figure 4:
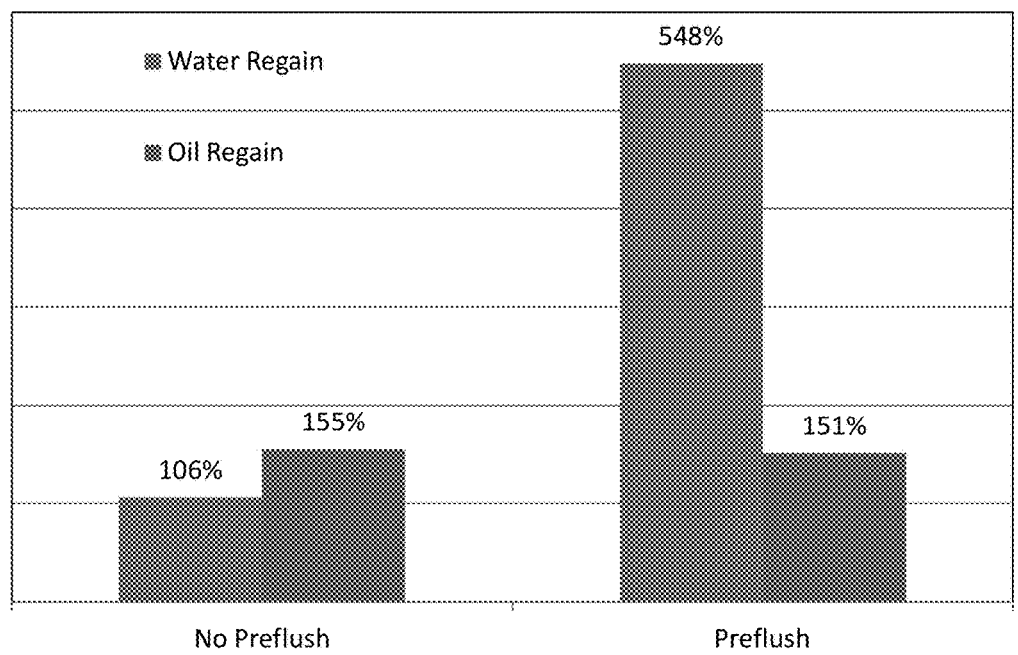
FIG. 4 illustrates the effect of pre-treatment on regain permeability in a Berea core by use of a surface modifying treatment agent.

FIG. 4 shows the results obtained for regain permeability. As illustrated, the water regain increased from 106% for the first core (no pre-flush) to 548% for the second core (pre-flush). This demonstrates better efficiency for bonding of the surface modifying treatment agent when the core is pre-flushed. The regain to oil remained essentially similar with or without pre-flush.

While exemplary embodiments of the disclosure have been shown and described, many variations, modifications and/or changes of the system, apparatus and methods of the present disclosure, such as in the components, details of construction and operation, arrangement of parts and/or methods of use, are possible, contemplated by the patent applicant(s), within the scope of the appended claims, and may be made and used by one of ordinary skill in the art without departing from the spirit or teachings of the disclosure and scope of appended claims. Thus, all matter herein set forth or shown in the accompanying drawings should be interpreted as illustrative, and the scope of the disclosure and the appended claims should not be limited to the embodiments described and shown herein.

What is claimed is:

1. A method of treating a siliceous containing subterranean formation penetrated by a well comprising:
   (b) binding the surface modifying treatment agent to a surface of the subterranean formation by attaching the anchor to the formation; and
   (c) aligning the surface modifying treatment agent to the siliceous containing subterranean formation such that the hydrophobic tail is directed away from the surface of the formation.

2. The method of claim 1, further comprising forming a monolayer or multi-layer assembly by self-alignment of the hydrophobic tail of the surface modifying treatment agent.

3. The method of claim 1, further comprising producing hydrocarbons from the well and reducing frictional drag during hydrocarbon production.

4. The method of claim 3, wherein a fluid on the surface of the substrate treated with the surface modifying treatment agent has a sliding angle which is less than the sliding angle of the fluid on a surface of a substantially similar untreated substrate.

5. The method of claim 1, wherein prior to pumping the surface modifying treatment agent into the well, reducing saturated water on the surface of the siliceous containing subterranean formation by pumping a non-aqueous fluid into the well.

6. The method of claim 5, further comprising removing water from the surface of the subterranean formation.

7. The method of claim 1, wherein the anchor is an organophosphorus acid derivative.

8. The method of claim 7, wherein step (b) comprises binding the surface modifying treatment agent to a surface of the subterranean formation by forming a O—P—O—Si covalent bond between the anchor and a siliceous formation.

9. The method of claim 7, wherein at least one of the following conditions prevail:
   (a) the surface modifying treatment agent alters the surface energy of the formation;
   (b) the surface modifying treatment agent stabilizes fines in the subterranean formation;
   (c) the well is a producing well and the surface modifying treatment agent decreases the amount of formation solids flowed back from the surface of the subterranean formation into the producing well;
   (d) the surface modifying treatment agent is a passive anti-microbial agent and minimizes or prevents the retention of water on the surface of the subterranean formation;
   (e) the surface modifying treatment agent passively inhibits or controls scale deposition onto or within the subterranean formation;
   (f) the surface modifying treatment agent passively prevents or controls deposition of organic particulates onto or within the surface of the subterranean formation;
   (g) the surface modifying treatment agent decreases the swelling of clay within the subterranean formation;
   (h) the surface modifying treatment increases the relative permeability of the formation to oil/gas with respect to water, thus preventing water banking behind the formation surface;
   (i) the well is a retrograde condensate gas reservoir and the surface modifying treatment agent minimizes condensation within the reservoir while maintaining the permeability of the reservoir;
   (j) the well is a gas or oil well and the surface modifying treatment agent enhances the amount of flowback water and produced water from the well following completion of a well treatment operation;
   (k) the surface modifying treatment agent is within a pad fluid;
   (l) the surface modifying treatment agent is within a well treatment fluid and the well treatment fluid is pumped into the well at a pressure sufficient to create or enlarge a fracture in the subterranean formation;
   (m) the surface modifying treatment agent is dispersed in a well treatment fluid;
   (n) the surface modifying treatment agent controls water condensation in the pores of the near wellbore region of the subterranean formation;
   (o) the formation is a tar sand formation and the surface modifying treatment agent enhances the recovery of hydrocarbons from deposits within the tar sand;
   (p) the subterranean formation is subjected to acidizing and the surface modifying treatment agent increases the penetration of acid into the formation; or
   (q) the subterranean formation is a matrix formation and the surface modifying treatment agent reduces the influx of water into the formation.

10. The method of claim 8, wherein the subterranean formation is a siliceous formation and further comprising binding the surface modifying treatment agent to the surface of the subterranean formation by forming a O—P—O—Si covalent bond between the anchor and the siliceous formation.

11. The method of claim 8, wherein the anchor is an organophosphorus acid derivative of an organophosphoric acid, organophosphonic acid or an organophosphimc acid.

12. The method of claim 8, wherein the surface modifying treatment agent is selected from the group consisting of $CF_3(C_nF_{2n})CH_2CH_2PO_3H_2$ where n is between 3 and 5, and $CF_3(CF_2)_x(O(CF_2CF_2)_y$—$CH_2CH_2$—$PO_3H_2$ where x is from 0 to 7, y is from 1 to 20 and x+y is less than or equal to 27.

13. The method of claim 8, wherein the surface modifying treatment agent is a derivative of an organophosphorus acid selected from the group consisting of amino trismethylene phosphonic acid, aminobenzylphosphonic acid, 3-amino propyl phosphonic acid, O-aminophenyl phosphonic acid, 4-methoxyphenyl phosphonic acid, aminophenylphosphonic acid, aminophosphonobutyric acid, aminopropylphosphonic acid, benzhydrylphosphonic acid, benzylphosphonic acid, butylphosphonic acid, carboxyethylphosphonic acid, diphenylphosphinic acid, dodecylphosphonic acid, ethylidenediphosphonic acid, heptadecylphosphonic acid, methylbenzylphosphonic acid, naphthylmethylphosphonic acid, octadecylphosphonic acid, octylphosphonic acid, pentylphosphonic acid, phenylphosphinic acid, phenylphosphonic acid, bis-(perfluoroheptyl) phosphinic acid, perfluorohexyl phosphonic acid, styrene phosphonic acid, and dodecyl bis-1,12-phosphonic acid.

14. The method of claim 8, wherein the subterranean formation is a carbonate formation or a sandstone formation.

15. The method of claim 8, wherein the surface modifying treatment agent is of the formula:

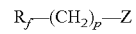

wherein:
   $R_f$ is a perfluorinated alkyl group or a perfluorinated alkylene ether group;
   p is 2 to 4; and
   Z is selected from the group consisting of:

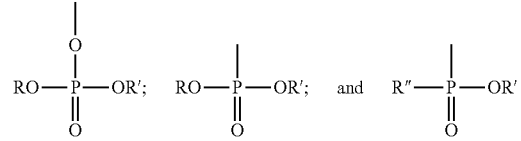

R and R" are each independently a radical having a total of 1 to 30 carbon atoms, optionally substituted with a perfluorinated alkyl group or a perfluorinated alkylene ether group;
R' is H, a metal or a lower alkyl having from 1 to 4 carbon atoms.

16. The method of claim 15, wherein the perfluoroalkylene ether group of $R_f$ is of the structure:

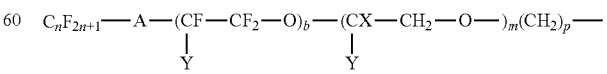

where A is an oxygen radical or a chemical bond; n is 1 to 20; Y is H, F, $C_nH_{2n+1}$ or $C_nF_{2n+1}$; b is at least 1; m is 0 to 50; p is 1 to 20; and X is H, F or an acid group or an acid derivative.

17. The method of claim 8, wherein the anchor of the surface modifying treatment agent has the structure $(RO)_x$—P(O)—$(OR')_y$ wherein x is 1-2, y is 1-2 and x+y=3; R is a radical having a total of 1-30 carbons; R' is H, a metal or an alkyl having 1 to 4 carbons and R is a saturated or unsaturated aliphatic group or an aryl or aryl-substituted moiety.

18. The method of claim 17, wherein R or R' contains a terminal or omega functional groups.

19. The method of claim 18, wherein the terminal or omega functional group is selected from the group consisting of carboxyl, hydroxyl, amino, imino, amido, thio, cyano, sulfonate, carbonate, phosphonic acid or a mixture thereof.

20. The method of claim 8, wherein the anchor of the surface modifying treatment agent is an organophosphorus acid derivative is at least one member selected from the group consisting of:

(a) a derivative of a phosphoric acid having the structure $(RO)_x$—P(O)—$(OR')_y$;

(b) a derivative of a phosphonic acid of the structure:

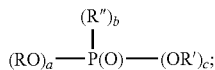

and (c) a derivative of a phosphinic acid of the structure:

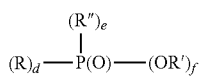

wherein:

R and R" are each independently a radical having a total of 1 to 30 carbon atoms, optionally substituted with a perfluorinated alkyl group or a perfluorinated alkylene ether group;

R' is H, a metal or a lower alkyl having from 1 to 4 carbon atoms;

x is 1 to 2; y is 1 to 2; x+y=3;

a is 0-1;

b is 1;

c is 1-2;

a+b+c is 3;

d is 0-2;

e is 0-2;

f is 1; and d+e+f is 3.

21. The method of claim 20, wherein the perfluorinated alkyl group or perfluorinated alkylene ether group has a perfluoroalkyl group of the structure:

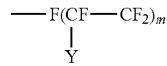

where Y is F or $C_nF_{2n+1}$ and is 4 to 20.

22. The method of claim 20, wherein R and/or R" is an unsubstituted or substituted $C_2$-$C_{20}$ aliphatic group, an aryl or an aryl-substituted group.

23. The method of claim 22, wherein R" is an aliphatic or aromatic substituent substituted with a fluoro or perfluoro group.

* * * * *

UNITED STATES PATENT AND TRADEMARK OFFICE
CERTIFICATE OF CORRECTION

PATENT NO. : 9,822,621 B2
APPLICATION NO. : 14/491772
DATED : November 21, 2017
INVENTOR(S) : Kimberly Lant et al.

It is certified that error appears in the above-identified patent and that said Letters Patent is hereby corrected as shown below:

In the Claims

Column 22, Lines 46-54:
Claim 1 should read:
- 1. A method of treating a siliceous containing subterranean formation penetrated by a well comprising:
 (a) pumping into the well a surface modifying treatment agent having an anchor and a hydrophobic tail wherein the hydrophobic tail is directly attached to the anchor when the surface modifying treatment agent is pumped into the well;
 (b) binding the surface modifying treatment agent to a surface of the subterranean formation by attaching the anchor to the formation; and
 (c) aligning the surface modifying treatment agent to the siliceous containing subterranean formation such that the hydrophobic tail is directed away from the surface of the formation. -

Signed and Sealed this
First Day of May, 2018

Andrei Iancu
*Director of the United States Patent and Trademark Office*